(12) United States Patent
Sueshige et al.

(10) Patent No.: US 6,470,981 B1
(45) Date of Patent: Oct. 29, 2002

(54) POWER-ASSISTED HAND CARRIER

(75) Inventors: Hiroshi Sueshige, Wako (JP); Kazuyoshi Miyahara, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/519,513

(22) Filed: Mar. 6, 2000

(30) Foreign Application Priority Data

Mar. 4, 1999 (JP) .......................................... 11-057675
Mar. 15, 1999 (JP) .......................................... 11-068950

(51) Int. Cl.[7] .............................................. B62D 51/04
(52) U.S. Cl. ......................... 180/19.3; 180/65.6; 280/78
(58) Field of Search ............................... 180/19.1, 19.2, 180/19.3, 65.6, 65.5, 65.8; 280/653, 655, 659, 78

(56) References Cited

U.S. PATENT DOCUMENTS

| | | | |
|---|---|---|---|
| 2,253,288 A | * 8/1941 | Lucchi ....................... | 180/19.1 |
| 2,601,752 A | * 7/1952 | Rose ......................... | 180/19.3 |
| 3,007,536 A | * 11/1961 | Overstreet ................ | 180/19.1 |
| 3,791,470 A | * 2/1974 | Baddore et al. ........... | 180/19.1 |
| 4,589,508 A | * 5/1986 | Hoover et al. ............. | 180/19.1 |
| 5,211,254 A | * 5/1993 | Harris, III et al. ......... | 180/19.1 |
| 5,305,843 A | * 4/1994 | Armstrong ................ | 180/19.1 |
| 5,375,673 A | 12/1994 | McCall et al. ............. | 180/13 |
| 5,465,801 A | * 11/1995 | Hoover ...................... | 180/19.1 |
| 5,489,000 A | * 2/1996 | Hillbohm .................. | 180/19.1 |
| 5,732,786 A | * 3/1998 | Fujigaki .................... | 180/19.3 |
| 5,878,827 A | * 3/1999 | Fox ........................... | 180/19.1 |
| 6,065,555 A | * 5/2000 | Yuki et al. ................. | 180/19.1 |
| 6,129,166 A | * 10/2000 | Sueshige et al. .......... | 180/65.5 |
| 6,173,799 B1 | * 1/2001 | Miyazaki et al. .......... | 180/19.3 |

FOREIGN PATENT DOCUMENTS

| | | | |
|---|---|---|---|
| EP | 0 841 235 A2 | * | 5/1998 |
| EP | 0 913 311 A1 | * | 5/1999 |
| GB | 1473445 | | 5/1977 |
| JP | 51025250 | | 6/1976 |
| JP | 3265403 | | 11/1991 |
| JP | 020000175309 A | * | 6/2000 |
| JP | 020000175310 A | * | 6/2000 |

* cited by examiner

Primary Examiner—Robert P. Olszewski
Assistant Examiner—Andrew J. Fischer
(74) Attorney, Agent, or Firm—Adams & Wilks

(57) ABSTRACT

In a power-associated hand carrier including a body frame on which a wheel and a motor for driving the wheel are mounted, a manually operated forward drive control member for enabling the motor to produce power assist for moving the hand carrier in the forward direction and a manually operated reverse drive control member for enabling the motor to produce power for driving the hand carrier in the backward direction are both provided on the distal end portion of one of two handlebars extending from a rear portion of the body frame obliquely upward in a rearward direction of the hand carrier. The hand carrier having such forward and reverse drive control members is easy to handle and can exhibit good mobility when used in a relatively narrow working area or when moving over rough or angulated ground surfaces.

17 Claims, 24 Drawing Sheets

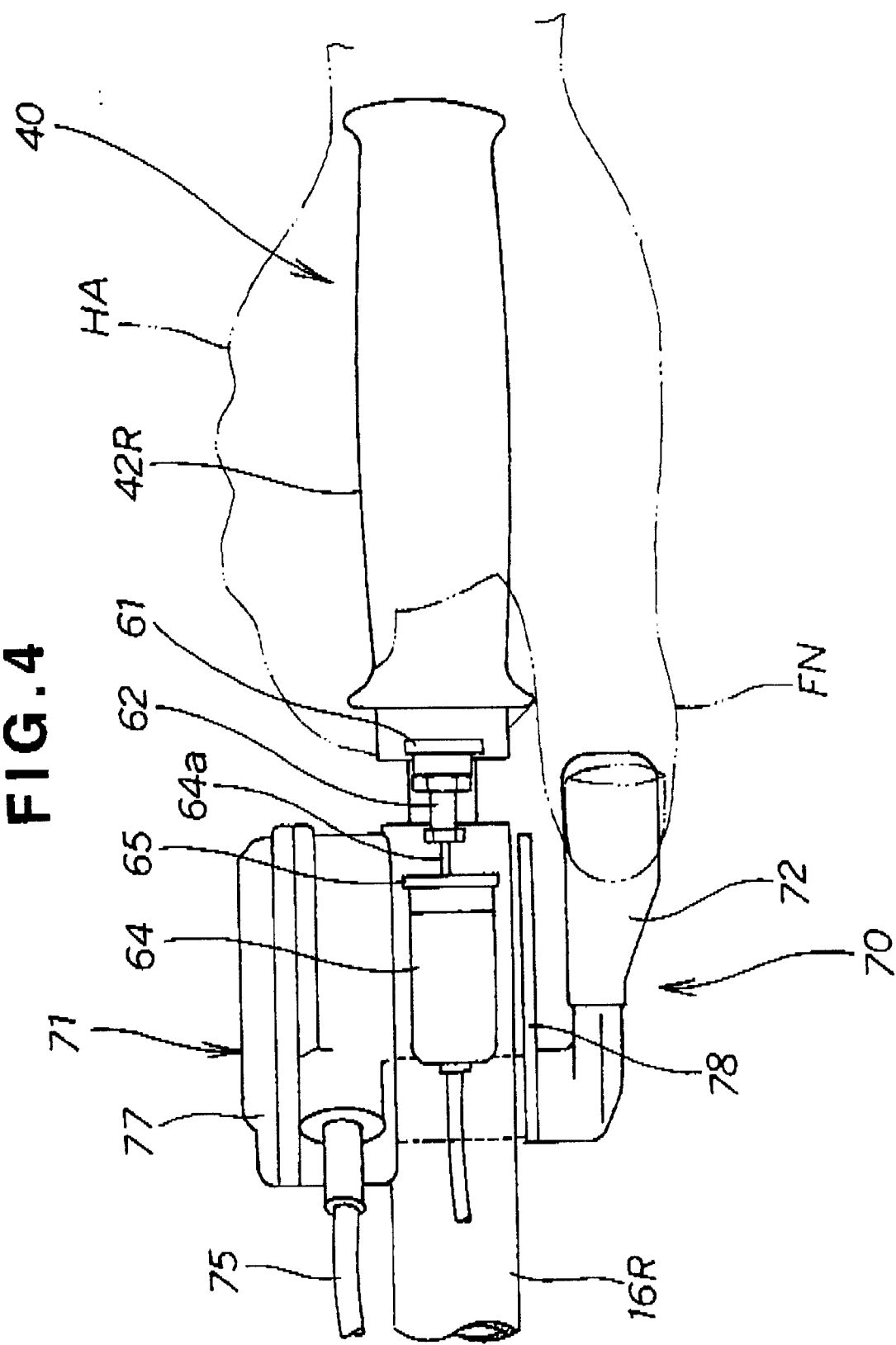

POWER-ASSISTED HAND CARRIER

BACKGROUND OF THE INVENTION

1. Field of the Invention

The present invention relates to improvements in and relating to a power-assisted hand carrier such as a motorized wheelbarrow.

2. Description of the Related Art

One example of known power-assisted hand carriers is disclosed in Japanese Patent Laid-open Publication HEI 3-265403. The disclosed power-assisted hand carrier includes a geared motor for rotating wheels of the hand carrier via a differential unit, and a single handlebar operatively connected with the geared motor for controlling operation of the geared motor. The handlebar is designed to move back and forth in response to a force applied thereto from the operator so that power generated by the geared motor varies with the amount of displacement of the handlebar.

It is proved that the conventional power-assisted hand carrier operates satisfactorily when used in a relatively wide working area or moving over relatively smooth ground surfaces. However, when the conventional power-assisted hand carrier is used in a relatively narrow working space or moving over rough or angulated ground surfaces, the force applied to the handlebar changes frequently with the result that assist power generated by the geared motor changes frequently, too. To deal with this frequent changes of assist power, the operator is forced to frequently change its working posture. Thus, the operator is subjected to a heavy burden or working load. This problem becomes significant when the hand carrier is to be moved backward because the operator should pay attention to the presence of an obstacle right behind the hand carrier.

SUMMARY OF THE INVENTION

It is accordingly an object of the present invention to provide a power-assisted hand carrier which is easy to handle and can exhibit good mobility when used in a relatively narrow working area or moving over rough or angulated ground surfaces.

To attain the forgoing object, there is provided, according to the present invention, a power-assisted hand carrier which comprises: a body frame; a load-carrying platform supported by an upper portion of the body frame; a pair of left and right handlebars extending from a rear portion of the body frame obliquely upward in a rearward direction of said body carrier; and at least one wheel rotatably supported by said body frame. A power unit is mounted on the body frame for producing rotating power. The power unit is operatively connected with the wheel such that the wheel is driven in rotation by the rotational power. A controller is provided for controlling operation of said power unit to change the direction and intensity of the rotating power so that the wheel can be driven in both forward and backward directions at a variable speed.

In one preferred form, the hand carrier is a power-assisted wheelbarrow having a single wheel which is supported by the body frame at a transverse central portion of the wheelbarrow.

The controller preferably includes a manually operated forward drive control member provided on a distal end portion of one of the handlebars for enabling the power unit to operate in such a manner as to produce necessary power assist for moving the hand carrier in a forward direction, and a manually operated reverse drive control member provided on the distal end portion of the one handlebar for enabling the power unit to operate in such a manner as to produce power for driving the hand carrier in a backward direction.

It is preferable that the manually operated forward drive control member is a slidable grip slidably mounted on the distal end portion of the one handlebar and movable in the forward direction in response to a forward thrust applied to the slidable grip, and the manually operated reverse drive control member is a manually operated reverse drive control lever pivotally mounted on the one handlebar in the proximity of the slidable grip. The controller further includes a first displacement sensor mounted on one of said one handlebar and the body frame for detecting a forward displacement of the slidable grip and producing an output signal corresponding to the detected forward displacement of the slidable grip, and a second displacement sensor mounted on one of said one handlebar and the body frame for detecting an angular displacement of the manually operated reverse drive control lever and producing an output signal corresponding to the detected angular displacement of the manually operated reverse drive control lever. The power unit produces the power assist based on the output signal from the first displacement sensor and also produces the driving power based on the output signal from the second displacement sensor.

The first displacement sensor may be a linear reciprocating potentiometer mounted on the one handlebar in the proximity of the slidable grip and having a slide rod directly connected to the slidable grip for reciprocating movement in unison with the slidable grip.

Preferably, the second displacement sensor is a potentiometer having a built-in selector switch for selecting one of the output signal from the first displacement sensor and the output signal from the second displacement sensor for the control of operation of the power unit. The selector switch is normally disposed in a position such that the output signal from the first displacement sensor is selected.

The potentiometer of the second displacement sensor may be a rotary potentiometer mounted on the body frame and having a rotary shaft operatively connected to the manually operated reverse drive control lever to rotate in response to pivotal movement of the manually operated reverse drive control lever, or a linear reciprocating potentiometer mounted on the one handlebar and having a slide rod operatively connected to the manually operated reverse drive control lever to reciprocate in response to pivotal movement of the manually operated reverse drive control lever.

Preferably, the power unit includes a drive source for producing rotational power, and a power transmitting mechanism for transmitting the rotational power from the drive source to the single wheel. The power transmitting mechanism includes a forward-reverse changeover clutch disposed in the proximity of an axle of the single wheel for mechanically switching rotating direction of the single wheel between the forward direction and the reverse direction.

In one preferred form, the forward-reverse changeover clutch includes: a forward drive bevel gear and a reverse driven bevel gear rotatably mounted in face to face on the axle; a drive bevel gear rotatably driven by the drive source and being in mesh with the forward and reverse driven bevel gears; forward clutch teeth forward on a surface of the forward driven bevel gear facing the reverse driven bevel gear; reverse clutch teeth formed on a surface of the reverse driven bevel gear facing the forward driven bevel gear; a clutch pin movably received in a longitudinal intermediate portion of the axle such that the clutch pin is movable along the axis of the axle with its opposite end portions projecting from the axle in a radial outward direction; a resilient member urging the clutch pin toward one end of the axle; the axle having an axial blind hole coaxial with the axle and extending from the one end toward the other end of the axle; a shift rod slidably fitted in the blind hole and having an inner end held in abutment with an outer peripheral surface of the clutch pin by the action of the resilient member, the shift rod being adapted to be manually reciprocated to move the opposite end portions of the clutch pin selectively into meshing engagement with the forward clutch teeth or the reverse clutch teeth.

Preferably, the axle has a radial guide slot extending radially through the longitudinal intermediate portion of the axle and slidably receiving the clutch pin, and a spacer collar is disposed between the surfaces of the forward and reverse driven bevel gears and extends around the longitudinal intermediate portion of the axle to prevent removal of the clutch pin from the radial guide slot.

BRIEF DESCRIPTION OF THE DRAWINGS

FIG. 4 is a plan view of FIG. 3;

DESCRIPTION OF THE PREFERRED EMBODIMENTS

Figure 1:
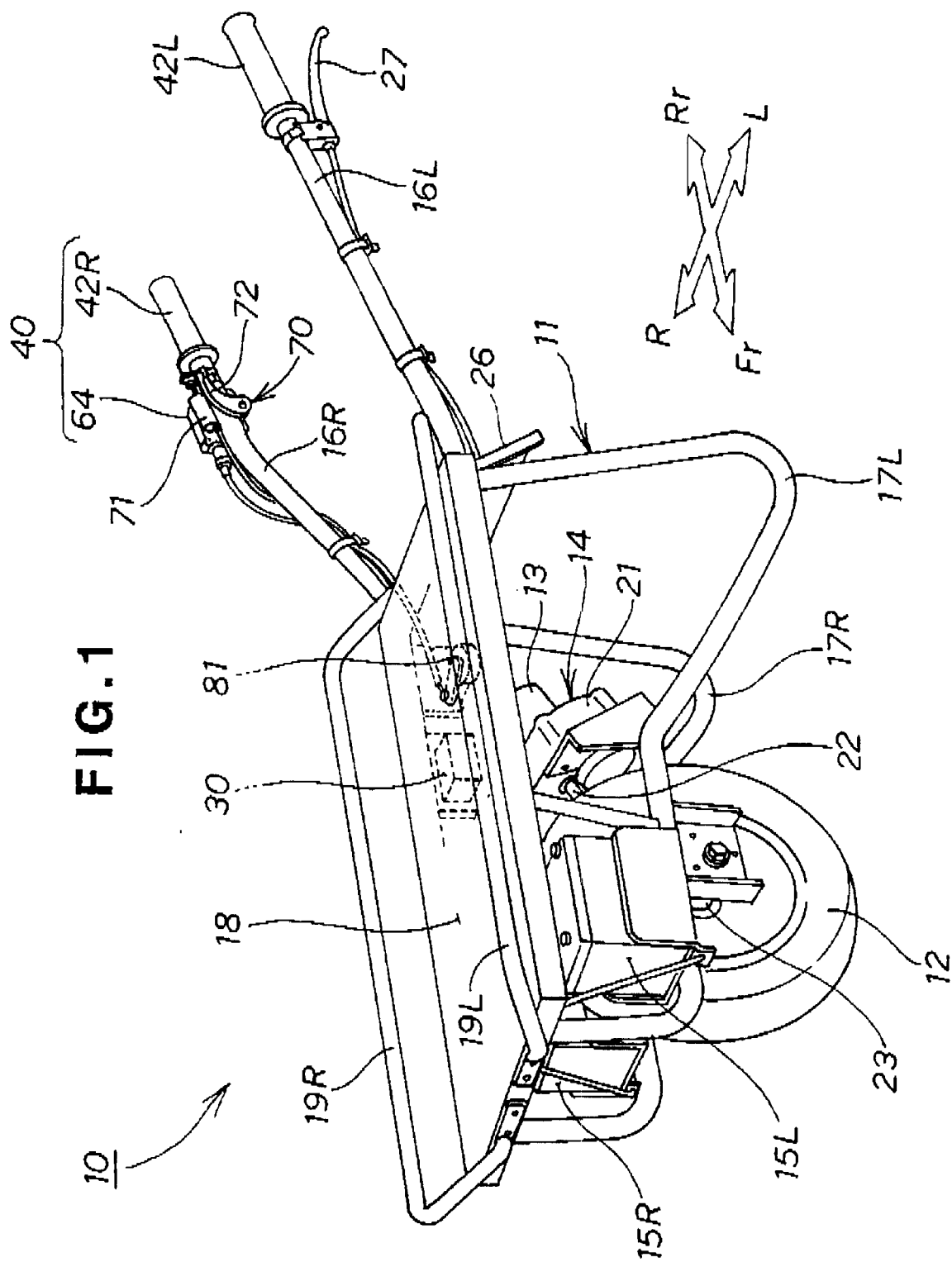
FIG. 1 is a perspective view of a power-assisted hand carrier according to a first embodiment of the present invention.

Certain preferred structural embodiments of the present invention will be described in greater detail with reference to the accompanying sheets of drawings in which like or corresponding parts are designated by the same reference characters throughout the several views. Throughout the description, the terms "front", "rear", "forward", "backward", "left", "right", "upward" and "downward" are used to refer to the directions as viewed from the operator. Similarly, the reference characters "Fr", "Rr", "L" and "R" associated with profiled arrows shown in the drawings are used to indicate the forward, backward, leftward and rightward directions, respectively.

FIG. 1 shows in perspective a power-assisted hand carrier according to a first embodiment of the present invention.

The illustrated power-assisted hand carrier 10 is a motorized wheelbarrow and includes a body frame 11 and a single wheel 12 rotatably supported by the body frame 11 at a transverse central portion of the hand carrier 10. An electric motor 13 for producing rotational assist power, a power transmission mechanism 14 for transmitting the assist power of the motor 11 to the wheel 12, and left and right batteries 15L, 15R for supplying electric power to the motor 13 are all mounted on the body frame 11. The hand carrier 10 has a pair of left and right handlebars 16L, 16R extending from a rear end portion of the body frame 11 obliquely upward in a rearward direction of the hand carrier 10, and a pair of left and right support stands 17L, 17R projecting downward from the rear end portion of the body frame 11 for supporting the hand carrier 10 while at rest. A rectangular load-carrying platform 18 is supported by an upper portion of the body frame 11 for carrying a load thereon, and a pair of left and right side rails 19L; 19R is mounted on the load-carrying platform 18 in opposed relation and extending along opposite longitudinal edges of the platform 18.

The power-assisted hand carrier (wheelbarrow) 10 of the foregoing construction can be hand-carried by the operator while the handlebars 16L, 16R are lifted upward to keep the support stands 17L, 17R in a floating condition above the ground surface.

The power transmission mechanism 14 includes a first speed reducer 21, a power transmitting shaft 22, and a second speed reducer (not shown) that are arranged in series for the transmission of rotational power from the motor 13 to an axle 23 to which the wheel 12 is mounted.

The left handlebar 16L is provided with a hand grip 42L at a distal end thereof. Similarly, the right handlebar 16R is provided with a hand grip 42R at a distal end thereof. A brake lever 27 is provided on the left handlebar 16L.

The power-assisted hand carrier 10 is equipped with a forward drive control mechanism 40 for controlling forward drive operation of the motor 13, and a reverse drive control mechanism 70 for controlling reverse drive operation of the motor 13. The forward drive control mechanism 40 is comprised of the right hand grip 42R and an axial displacement detecting device or sensor 64. The reverse drive control mechanism 70 is comprised of a control lever mechanism 71 and an angular displacement detecting device or sensor 81.

The right hand grip 42R is a slidable grip and forms a forward operation control member which when manipulated by the operator, controls operation of the motor 13 to produce assist motor power required for power-assisted forward driving of the hand carrier. The axial displacement sensor 64 is mounted on the right handlebar 16R in the proximity of the forward operation control member (slidable grip( 42R. The control lever mechanism 71 includes a control lever 72 pivotally mounted on the right handlebar 16R in close proximity to the right grip 42R. The control lever 72 forms a reverse operation control member which when manipulated by the operator, controls driving operation of the motor 13 to produce assist motor power required to power-assisted reverse driving of the hand carrier. The angular displacement sensor 81 is mounted on the body frame 11.

Figure 2:
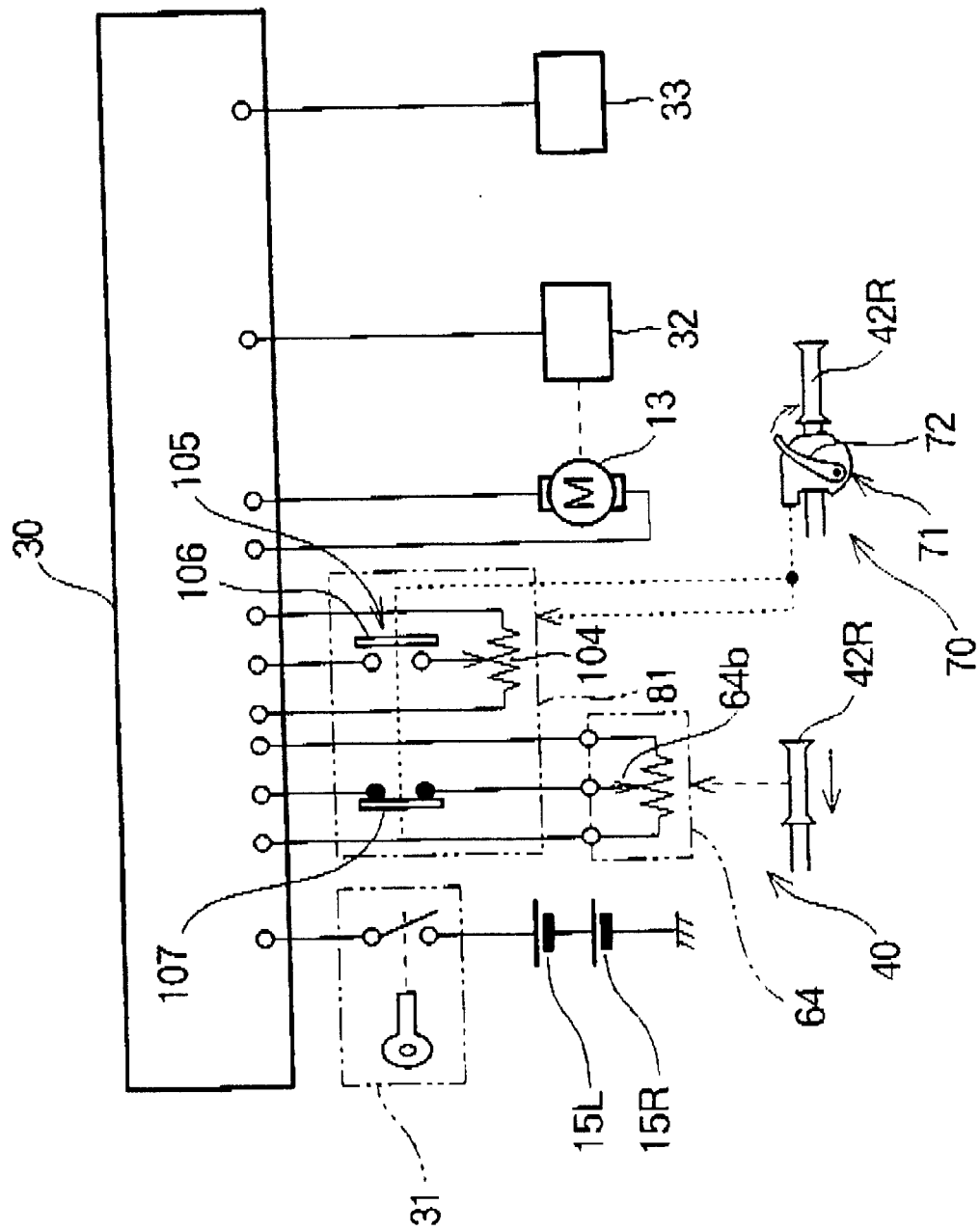
FIG. 2 is a circuit diagram showing a control system of the hand carrier.

The hand carrier 10 further includes an electric control unit 30 mounted on the body frame 11. The control unit 30, as shown in FIG. 2, is electrically connected with the forward and reverse drive control mechanism 40, 70 and the motor 13 and controls operation of the motor 13 according to operation of the drive control mechanism 40, 70. The control unit 30 is also electrically connected with the batteries 15L, 15R, a key switch (main switch) 31, a speed detection device or sensor 32, and a battery power meter 33. The key switch 31 and the battery power meter 33 are mounted on an instrument panel 26 attached to the rear end portion of the body frame 11. The speed sensor 32 detects speed of the hand carrier 10. In the illustrated embodiment, the speed sensor 32 is built in the motor 13 and detects rotating speed (revolutions per minute) of the motor 13 which is in direct proportional to the speed of the hand carrier 10.

The control unit 30 has both a function to control forward rotation or driving of the motor 13 on the basis of an output signal (detection signal) from the axial displacement sensor 64 of the forward drive control mechanism 40 and an output signal (detection signal) from the speed sensor 32, and a function to control backward or reverse rotation of the motor 13 on the basis of an output signal (detection signal) from the angular displacement sensor 81 of the reverse drive control mechanism 70 and the output signal from the speed sensor 32. A typical control system that can be used for controlling the operation of the motor 13 is the voltage control system.

The axial displacement sensor 64 detects the amount of axial displacement of the slidable right grip 42R in a direction toward the body frame 11 (namely the forward direction) and outputs an electric signal corresponding to the detected axial displacement of the right grip 42R. In the illustrated embodiment, the axial displacement sensor 64 is a linear reciprocating potentiometer. The angular displacement sensor 81 is constructed to detect the amount of angular displacement of the control lever 72 and output an electric signal corresponding to the detected angular displacement of the control lever 72. In the illustrated embodiment, the angular displacement sensor 81 is a rotary potentiometer.

As shown in FIG. 2, the potentiometers 64, 81 are each comprised of a variable resistance transducer having three terminals. Two of the three terminals are connected to opposite ends of a resistance element, and the remaining terminal is connected to a sliding contact which is mechanically moved along the resistance element.

The angular displacement sensor 81 contains within it a selector switch 105. The selector switch 105 selects either the output signal of the axial displacement sensor 64 or the output signal of the angular displacement sensor 81 for feeding to the control unit 30. By virtue of the selector switch 105, the control unit 13 is able to undertake control operation of the motor 13 based on only on output signal.

The selector switch 105 has a normally closed contact 107 connected in series with the output terminal of the angular displacement sensor 64, and a normally open contact 106 connected in series with the output terminal of the angular displacement sensor 81. The selector switch 105 changes over the position of state of the contacts when energized or de-energized in response to the angular position of the control lever 72.

Figure 3:
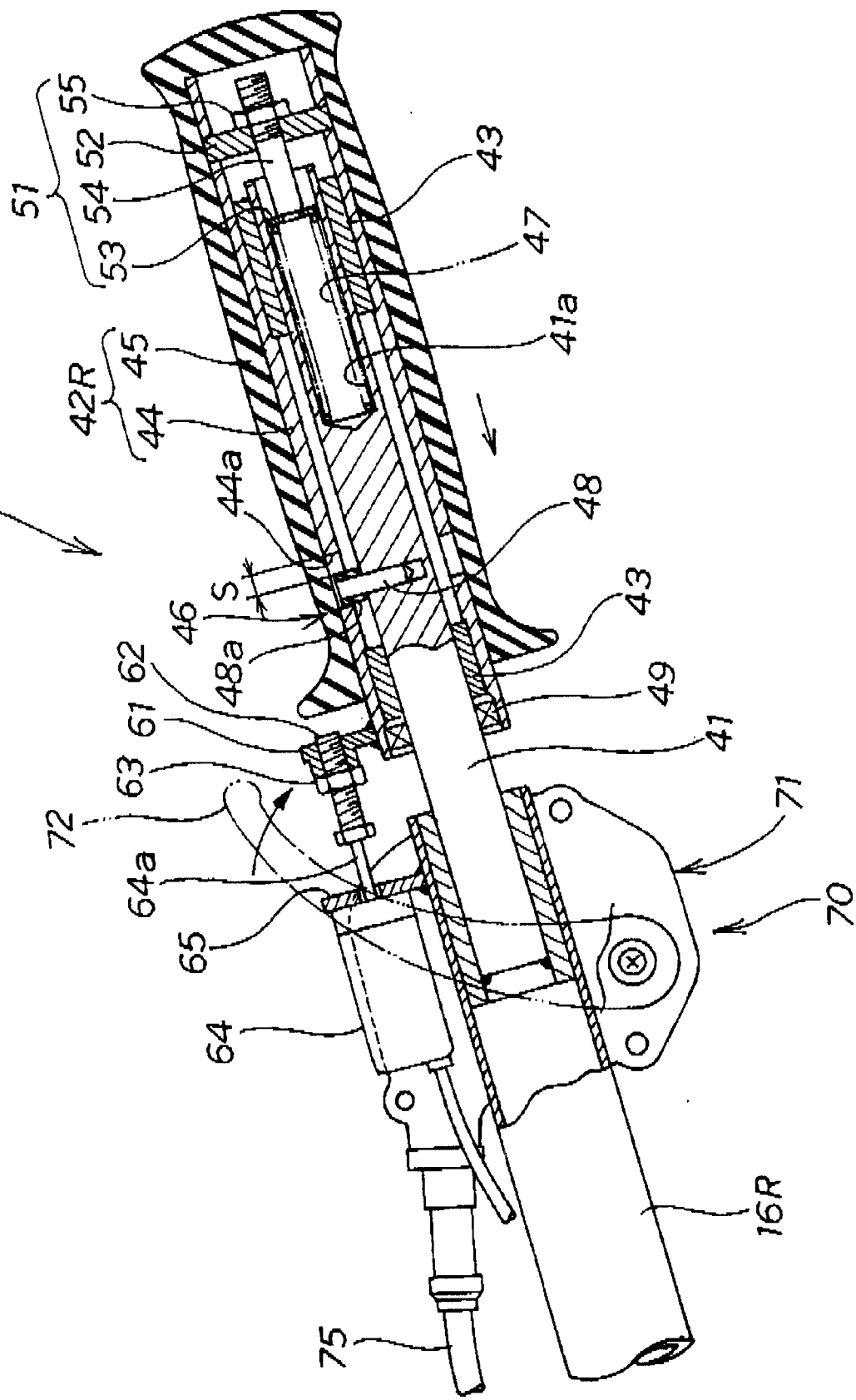
FIG. 3 is a side view, with parts shown in cross section, of a right handlebar of the hand carrier on which forward and reverse drive control mechanisms and an associated sensor are mounted.

As shown in FIG. 3, the right handlebar 16R is formed from a pipe and includes a round bar 41 fixedly attached to the distal end of the handlebar 16R. The right grip 42R is a slidable grip as described above and includes a tubular slider 44 slidably fitted around the round bar 41, and a rubber grip 45 fitted over the slider 44.

The tubular slider 44 of the slidable grip 42R is slidably mounted on the round bar 41 via two axially spaced bushings (sleeve bearings) press-fitted in the tubular slider 44 at from and rear portions thereof. The slidable grip 42R further includes a stopper mechanism 46 disposed between the handlebar 16R and the slider 44 so as to limit axial displacement of the grip 42R within a predetermined distance S, a resilient member 47 for urging the grip 42R toward the operator (i.e., the right-hand direction of FIG. 3), and a neutral adjustment mechanism 51 for adjusting the initial position of an operational neutral point of the resilient member 47.

The stopper mechanism 46 includes a stopper pin 48 fixed to the round bar 41 and projecting from the bar 41 in a radial outward direction, and an axial oblong hole 44a formed in the tubular slider 44 and slidably receiving therein a projecting portion of the stopper pin 48. The length of the oblong hole 44a is determined such that the slider 44 is permitted to move relative to the round bar 41 in the axial direction within the predetermined distance S. The stopper mechanism 46 consisting of a pin and oblong-hole connection is simple in construction but is able to limit the axial displacement of the grip 42R within the predetermined distance while preventing angular movement or rotation of the grip 42R relative to the round bar 41 of the handlebar 16R. The projecting portion of the stopper pin 48 may be covered with a cushioning material 48a such as rubber.

The resilient member 47 is a compression coil spring received in an axial hole 41a drilled in the bar 41 from a rear end face (right end face in FIG. 3) thereof. The neutral adjustment mechanism 51 includes a support plate 52 attached to the rear end portion of the slider 44 in rear of the rear end of the rod 41, an adjustment bolt 54 concentric with the compression coil spring 47 and threaded through the support plate 52, a presser ring or washer 53 disposed between the compression coil spring 47 and a front end of the adjustment bolt 54, and a lock nut 55 threaded with a rear end of the adjustment bolt 54 to securely fasten the bolt 54 to the support plate 52. The washer 53 may be firmly connected to the front end of the bolt 54. Though not shown, the adjustment bolt 54 has a hexagonal hole formed in a rear end face thereof for receiving therein a suitable tool, such as a hexagon bar wrench, when the bolt 54 is to be turned. By turning the adjustment bolt 54 while the lock nut 55 is kept loosened, the adjustment bolt 54 is displaced in an axial direction relative to the support plate 54 so that the initial length of the compression coil spring 47 can be adjusted.

The tubular slider 44 has a support arm 61 projecting from the front end thereof in a radial outward direction, an adjustable actuating bolt 62 fastened to the support arm 61 with an enlarged head thereof directed forward (left-hand direction in FIG. 3), and a lock nut 63 threaded with the bolt 62 to lock the bolt 62 in position against the movement relative to the support arm 61.

The axial displacement sensor 64 is mounted to a bracket 65 attached to the distal end portion of the handlebar 16R. The displacement sensor 64 has a slide rod 64a arranged to automatically return to the illustrated neutral position by the action of an automatic return to the illustrated neutral position by the action of an automatic return mechanism (not shown). The slide rod 64a has an outer end (rear end) held in abutment with the head of the adjustment bolt 62 and an inner end (front end) connected to the sliding contact 64b (FIG. 2) of the axial displacement sensor 64. Thus, when the grip 42R is pushed by the operator to displace the slidable rod 64a forward via the actuating bolt 62, the sliding contact 64b of the axial displacement sensor 64 generates an output signal corresponding to the amount of axial displacement of the grip 42R. The front end portion of the tubular slider 44 and the round rod 41 are sealed by a packing 49.

Operation of the forward drive control mechanism 40 will be described below with reference to FIG. 3.

In the initial condition shown in FIG. 3, the right grip 42R is in the neutral position and, hence, no output signal is outputted from the axial displacement sensor 64. When the right grip 42R is pushed or thrust in the forward direction (left-hand direction of FIG. 3) while being gripped by the operator, a pushing force is transmitted to the resilient member (compression coil spring) 47 successively through the slider 44, support plate 52, adjustment bolt 54 and the washer 53. Thus, the right grip 42R (i.e., the slider 44 and rubber grip 45) is displaced forward by a distance corresponding to the intensity of pushing force applied to the right grip 42R against the resiliency of the resilient member 47. Forward movement of the slider 44 causes the actuating bolt 62 to displace the slide rod 64a of the axial displacement sensor 64 in the forward direction by the same distance as the slider 44 (right grip 42R). In response to the displacement of the slide cord 64a, the axial displacement sensor 64 generates an output signal indicative of the amount of axial displacement of the right grip 42R.

When the pushing force on the right grip 42R is released, the right grip 42R is allowed to return to its initial position of FIG. 3 by the resiliency of the resilient member 47, and the output signal from the axial displacement sensor 64 becomes nil.

As shown in FIG. 4, when the control lever mechanism 71 of the reverse drive control mechanism 70 is attached to the distal end portion of the right handlebar 16R. The control lever 72 of the control lever mechanism 71 is disposed on the interior side of the handlebar 16R and located at a position adjacent to the right grip 42R so that the operator can easily manipulate the control lever 72 with the thumb FN of its right hand HA while gripping the right grip 42R. With this arrangement, when the operator grips the right grip 42R with its right hand HA in a shake-hand fashion, the thumb FN of the right hand HA is naturally placed on the control lever 72 which is provided on the interior side of the handlebar 16R. The control lever 72 can, therefore, be manipulated easily and reliably.

Figure 5A:
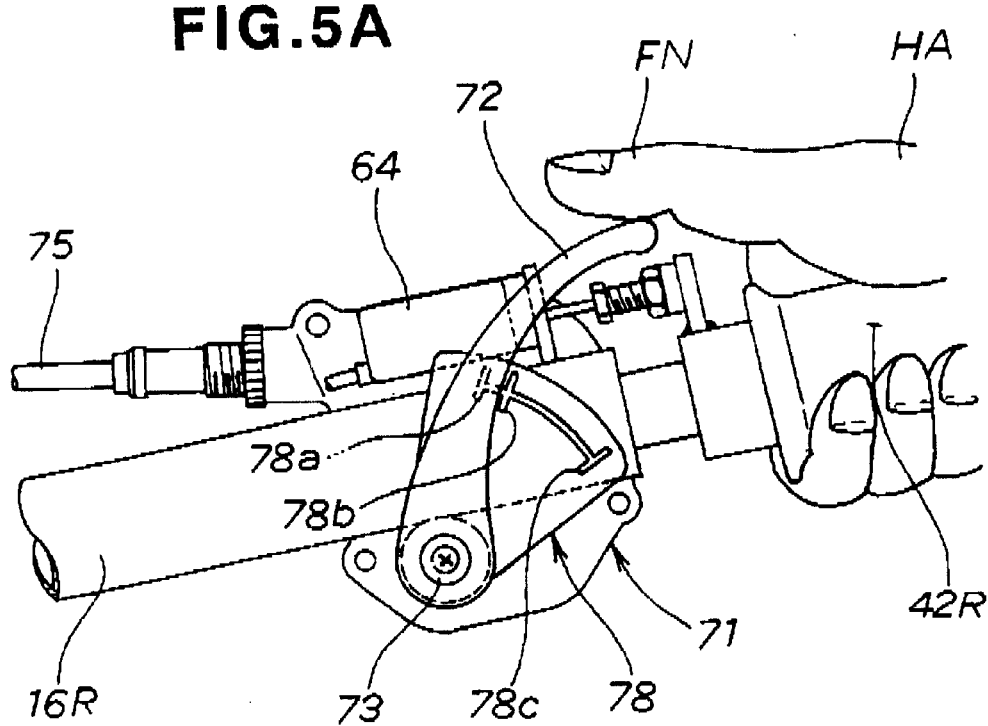
FIG. 5A is a side view showing a control lever mechanism of the reverse drive control mechanism.

The control lever 72, as shown in FIG. 5A, is pivotally supported on one end of a horizontal pivot shaft 73 projecting from a casing 77 in a lateral inward direction. The casing 77 is attached to the exterior side of the handlebar 16R, and the pivot shaft 73 extends transversely across the casing 77. The casing 77 contains within it an intermediate lever 74 (FIG. 5B) pivotally mounted on the pivot shaft 73. The intermediate lever 74 and the control lever 72 are connected together at one end for pivotal movement in unison with each other about the pivot shaft 73. The other end (distal end) of the intermediate lever 74 is connected to one end of a throttle wire 75. A torsion spring 76 (FIG. 5B) is housed in the casing 77 and acts between the intermediate lever 74 and the casing 77 to urge the intermediate lever 74 in the counterclockwise direction so that when the control lever 72 is released, the intermediate lever 74 is allowed to automatically return to its original position of FIG. 5B under the force of the torsion spring 76. Thus, the torsion spring 75 forms an auto-return mechanism.

Figure 5B:
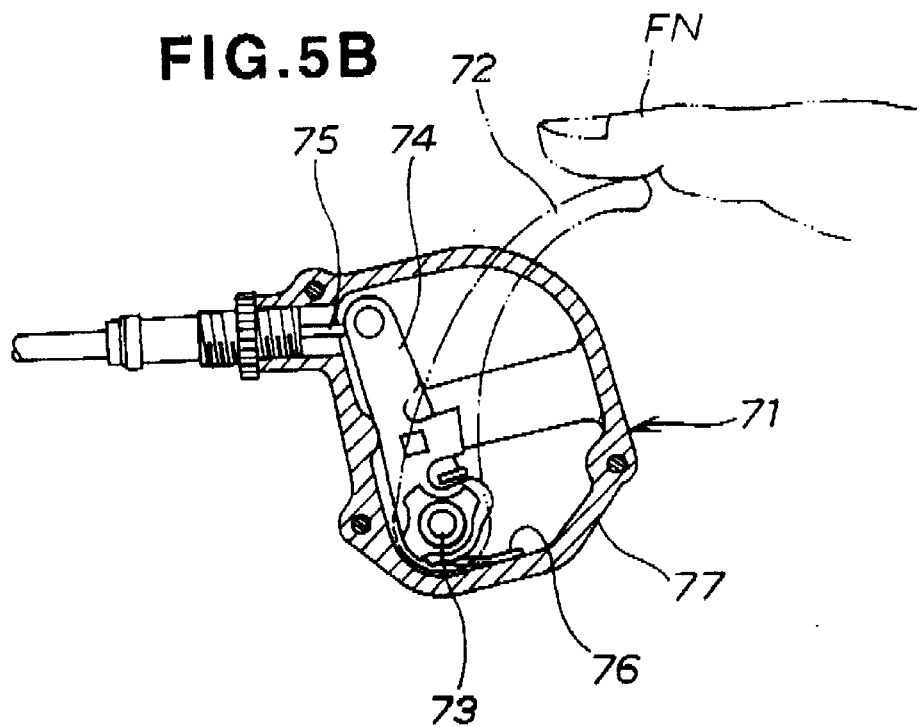
FIG. 5B is a vertical cross-sectional view of the control lever mechanism shown in FIG. 5A.

The intermediate lever 74, as it returns to its original position, brings the control lever 72 back to its original position of FIG. 5B, the control lever 72 is returned to its original position which is corresponding in position to a mark 78a (FIG. 5A) formed on a throttle position indicator 78 attached to the casing 71. The indicator 78 is in the form of a segment of a circle concentric to the pivot shaft 73 and has two additional marks 78b and 78c arranged, together with the first mark 78a, on an arc concentric to the pivot shaft 73. The first mark 78a is located on one end (left end in FIG. 5A) of the arc and indicates the "forward" operation mode of the hand carrier. The second mark 78b is located near the first mark 78a and indicates the "reverse" operation mode of the hand carrier. The third mark 78c is located at the opposite end (right end in FIG. 5A) of the arc and indicates the "high-speed reverse" operation mode. The indicator facilitates easy operation of the control lever 72 because it enables the operator to visually observe the current operation mode of the power-assisted hand carrier which is accurately linked with the angular position of the control lever 72.

Figure 6A:
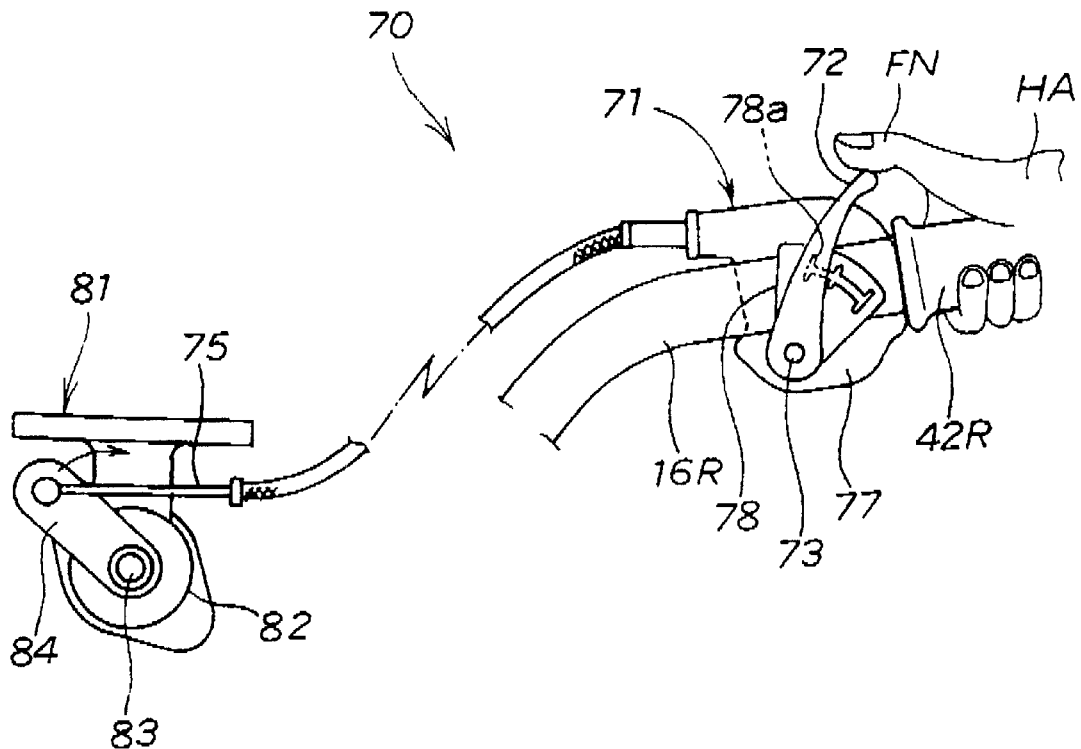
FIGS. 6A and 6B are schematic views illustrative of the operation of the reverse drive control mechanism.
Figure 6B:
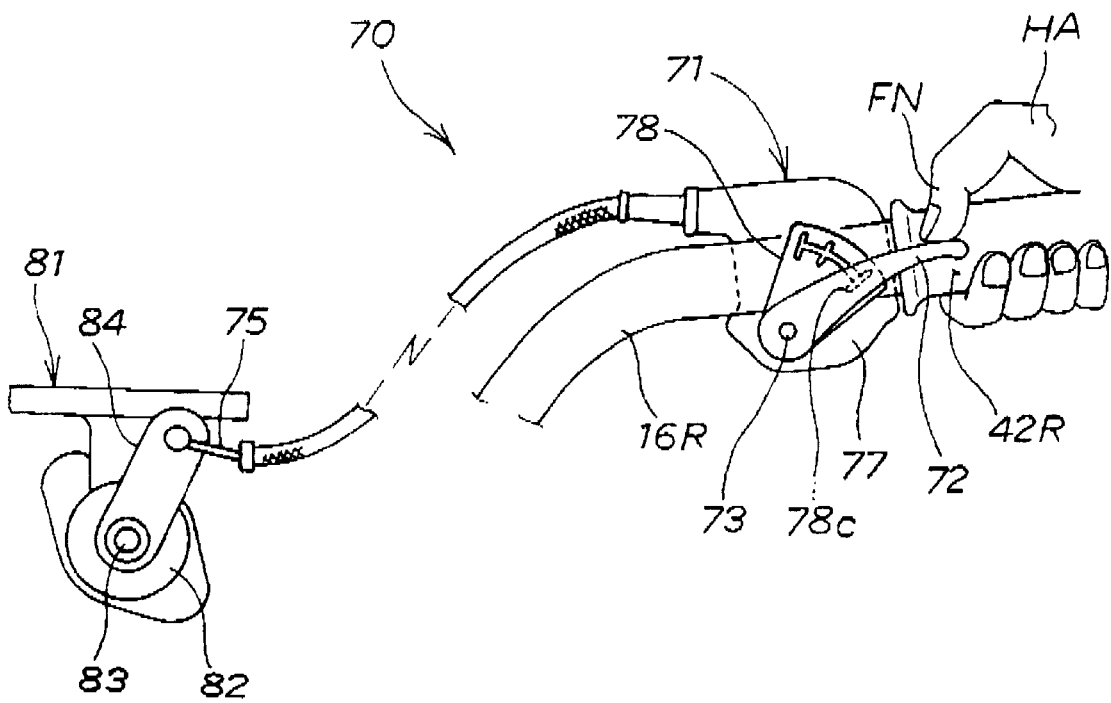

FIGS. 6A and 6B show the operational relationship between the control lever mechanism 70 and the angular displacement sensor 81 of the reverse drive control mechanism 70. The angular displacement sensor 81 is formed by a rotary potentiometer as previously described with reference to FIG. 2, and it includes a lever 84 firmly connected to one end to a rotary shaft 83 rotatably supported by a housing or case 82 of the sensor 81. The case 82 is attached to the body frame 11. The lever 84 is connected at its distal end to the outer end of the throttle wire 75.

With this arrangement, when the control lever 72 is turned clockwise in FIG. 6A, the throttle wire 75 is pulled rightward, causing the lever 84 and the rotary shaft 83 together to turn in the clockwise direction about an axis of the rotary shaft 83, as shown in FIG. 6B. As the rotary shaft 83 thus rotates, the sliding contact (see FIG. 2) of the potentiometer slides along the resistance element of the rotary potentiometer, thereby varying the resistance value of the potentiometer. As a result, the output signal from the rotary potentiometer (angular displacement sensor) 81 varies with the amount of angular displacement of the control lever 72.

Though not shown, the senor 81 has a torsion spring disposed inside the case 82 and acts between the lever 84 and the case 82 to urge the lever 84 counterclockwise toward the original position shown in FIG. 6A. Thus, when a pressure or force tending to turn the control lever 72 in the clockwise direction is released, the control lever 72 automatically returns to its original position shown in FIGS. 5A and 6A by the force of the torsion spring 76 (FIG. 5B). With this returning movement of the control lever 72, the pulling force on the throttle wire 75 is released. At the same time, the lever 84 returns to its original position of FIG. 6A by the force of the torsion spring (not shown but similar to the one 76 shown in FIG. 5B). Upon arrival of the lever 84 (corresponding to the sliding contact of the rotary potentiometer), the output signal from the angular displacement sensor 81 becomes nil.

Figure 7:
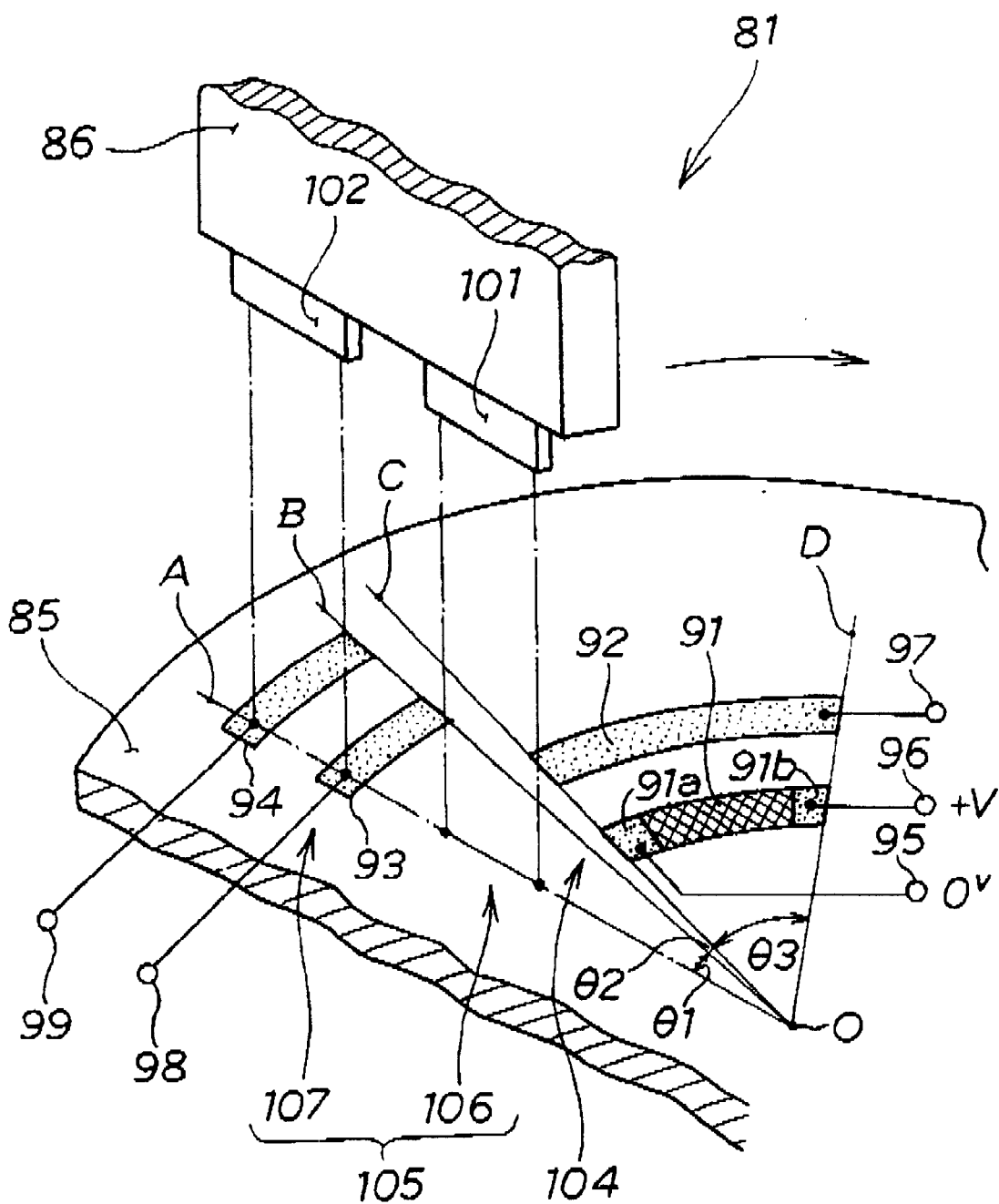
FIG. 7 is a perspective view showing a portion of an angular displacement sensor of the reverse drive control mechanism.

The angular displacement sensor 81 taking the form of a rotary potentiometer will be described in further details with reference to FIG. 7.

The angular displacement sensor 81 is generally comprised of a fixed flat circular disc 85, and a movable member 86 slidable on one surface (upper surface in FIG. 7) of the fixed disc 85 along a circular path which is concentric to the center 0 of the fixed disc 85. The movable member 86 is connected to the rotary shaft 83 (FIGS. 6A and 6B) having an axis of rotation which is in register with the center 0 of the fixed disc 85. The upper surface of the fixed disc 85 is formed with a resistor strip (resistance element) 91, a first conductor strip 92, a second conductor strip 93 and a third conductor strip 94 that are all arcuate in shape and arranged concentrically about the center 0 of the fixed disc 85 in the order named when viewed from the center 0 toward a radial outward direction of the fixed disc 85. The resistance element 91 is connected at opposite ends to first and second terminals 95 and 96 via first and second conductors 91a and 91b. The first, second and third conductor strips 92, 93 and 94 are connected to third, fourth and fifth terminals 97, 98 and 99, respectively.

The upper surface of the fixed disc 85 has three consecutive angular ranges $\ominus 1$, $\ominus 2$, $\ominus 3$ arranged about the center 0 in the order named when viewed in the clockwise direction in FIG. 6. The second and third conductor strips 93, 94 are arranged to extend over the first angular range $\ominus 1$ which is defined between a neutral position A and a first intermediate position B spaced clockwise from the neutral position by a predetermined distance. The second angular range $\ominus 2$ is considerably smaller than the first angular range $\ominus 1$ and is defined between the first intermediate position B and a second intermediate position C spaced a distance from the first intermediate position B. There are not electrical components (conductors and resistors, for example) arranged within the second angular range $\ominus 2$. The first conductor strip 92 and the resistance element 91 are arranged to extend over the third angular range $\ominus 3$ which is defined between the second intermediate position C and an endmost position D located on the opposite side of the neutral position A.

The first terminal 95 is an earth or ground terminal. The second terminal 96 is a reference voltage terminal. The third terminal 97 is an output terminal. The forth and fifth terminals 98 and 99 are switching terminals.

The movable member 86 has a first sliding contact 101 arranged to slide along the resistor strip 91 and the first conductor strip 92, and a second sliding contact 102 arranged to slide along the second and third conductor strips 93, 94. The resistor strip 91, first conductor strip 92 and first sliding contact 101 together form a potentiometer 104 and a normally open switch portion (normally open contacts) 106 of the selector switch 105 previously described with reference to FIG. 2. The second and third conductor strips 93, 94 and second sliding contact 102 jointly form a normally closed switch portion (normally closed contacts) 107 of the selector switch 105 (FIG. 7).

Referring now to FIGS. 8A–10B, operation of the angular displacement sensor 70 will be described in conjunction with various operating positions of the control lever mechanism 71 of the reverse drive control mechanism 70.

Figure 8A:
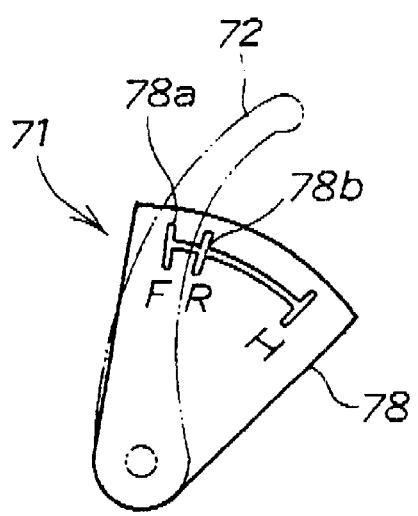
FIGS. 8A and 8B are schematic views showing the positional relationship between a control lever of the reverse drive control mechanism and the angular displacement sensor, the lever being in the forward drive position.
Figure 8B:
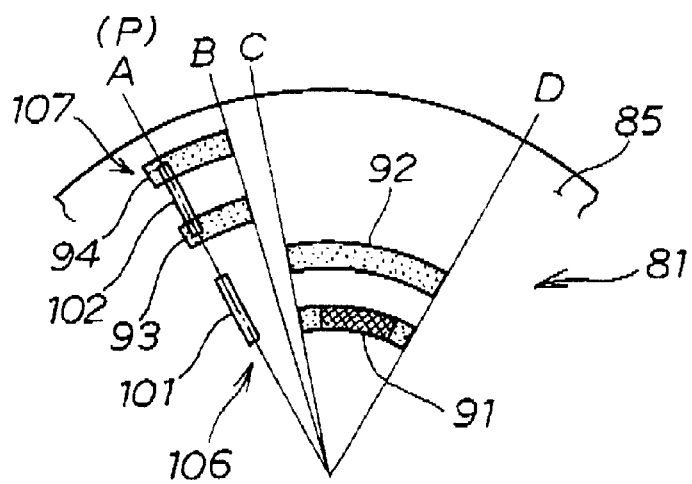

When the phantom-lined control lever 72 of the control lever mechanism 71 is in the original (forward) position indicated by the mark 78a on the throttle position indicator 78, as shown in FIG.8A, the power-assisted hand carrier 10 (FIG. 1) is in the forward operation mode. In this instance, the first and second sliding contacts 101, 102 are disposed in the neutral position A on the fixed disc 85, as shown in FIG. 8B. In this condition, the normally open switch portion 106 of the selector switch 105 (FIG. 5) is in the OFF state, and the normally closed switch portion 107 of the selector switch 105 (FIG. 2) is in the ON state. Thus, the control unit 30 shown in FIG. 2 can receive an output signal from the axial displacement sensor 64 only.

Figure 9A:
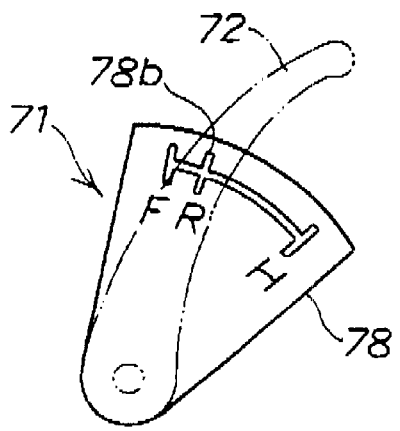
FIGS. 9A and 9B are views similar to FIGS. 8A and 8B, but showing the control lever disposed in the neutral position.
Figure 9B:
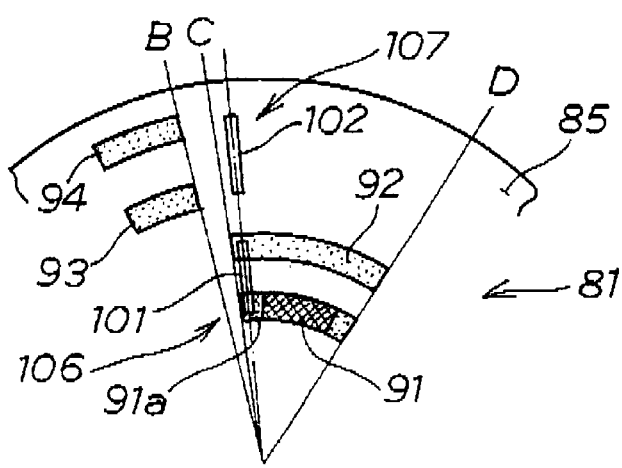

When the power-assisted hand carrier 10 (FIG. 1) is to be operated in the reverse operation mode, the control lever 72 of the control lever mechanism 71 is moved from the original position of FIG. 8A to the reverse position indicated by the mark 78b on the throttle position indicator 78 shown in FIG. 9A. In this instance, the first and second sliding contacts 101, 102 are located in a position slightly offset clockwise from second intermediate position C on the fixed disc 85, as shown in FIG. 9B. Under such condition, the normally open switch portion 106 of the selector switch 105 (FIG. 2) is in the OFF state, while the normally closed switch portion 107 of the selector switch 105 is in the OFF state. Thus, the control unit 30 shown in FIG. 2 can receive an output signal from the angular displacement sensor 81 only.

Figure 10A:
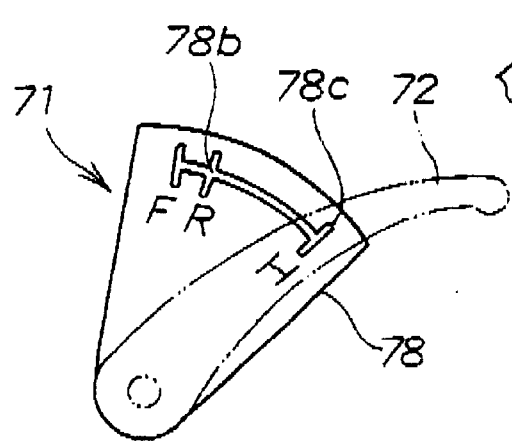
FIGS. 10A and 10B are views similar to FIGS. 8A and 8B, but showing the control lever disposed in the high-speed reverse drive position.
Figure 10B:
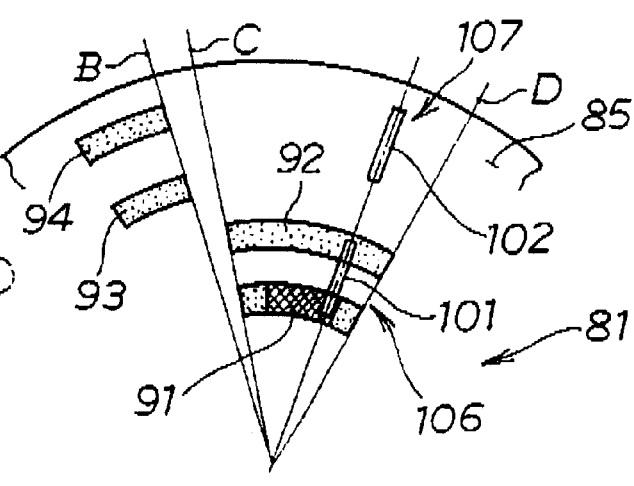

When the control lever 82 is in the high-speed position indicated by the mark 78c on the throttle position indicator 78, as shown in FIG. 10A, the power-assisted hand carrier 10 (FIG. 1) is in the high-speed reverse operation mode. In this instance, the normally open switch portion 106 of the selector switch 105 (FIG. 2) is still in the ON state and the normally closed switch portion 107 of the selector switch 105 is still in the OFF state. As the control lever 72 moves from the reverse position of FIG. 9A to the high-speed reverse position of FIG. 10A, the first sliding contact 101 moves from the position of FIG. 9B to the position of FIG. 10B. With this movement of the first sliding contact 101, the resistance value of the resistor strip (resistance element) 91 decreases gradually and the output from the potentiometer (angular displacement sensor) 81 increases gradually to approach the reference voltage.

Figure 11A:
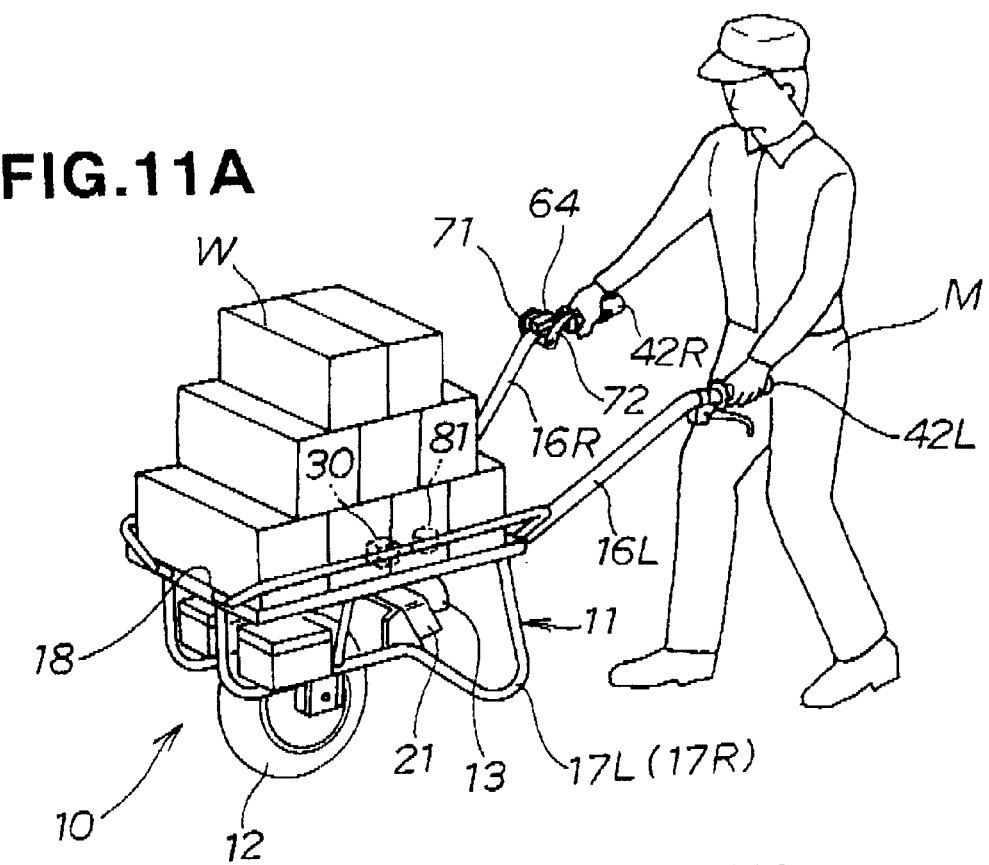
FIGS. 11A to 11C are schematic views illustrative of the operation of the power-assisted hand carrier in conjunction with the position of respective drive control members of the forward and reverse drive control mechanism.
Figure 11B:
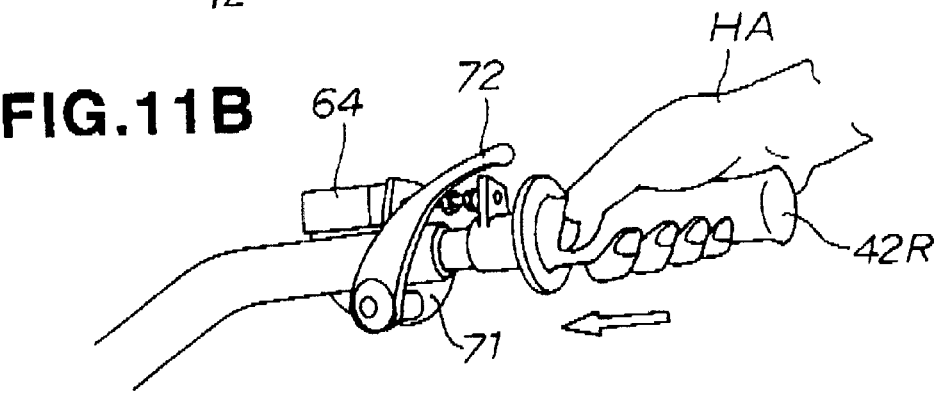
Figure 11C:
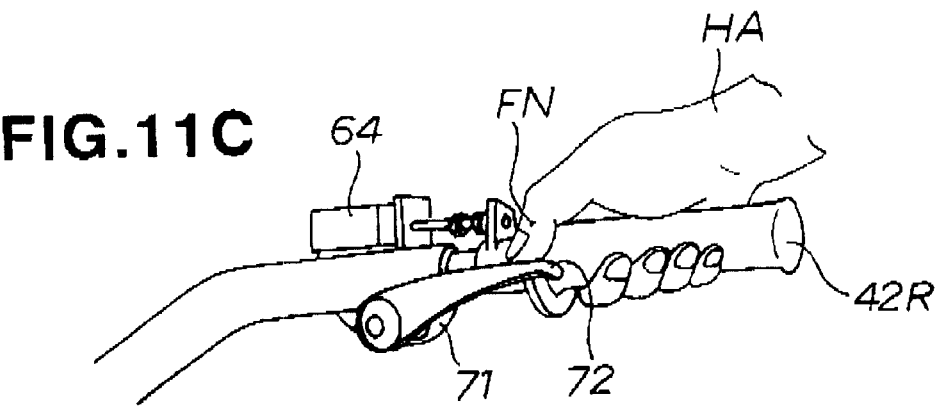

FIGS. 11A–11C illustrate the manner in which the power-assisted hand carrier 10 is maneuvered.

As shown in FIG. 11A, the operator or user M lifts up the left and right operation handles 16L, 16R of the hand carrier 10 while gripping the left and right grips 42L, 42R of the handlebars 16L, 16R so that the left and right stands or legs 17L, 17R are held in a floating condition above the ground surface with a load (such as a stack of packaged products) carried on the load-carrying platform 18. While keeping this condition, the operator M walks forward so that the hand carrier 10 is advanced.

When the hand carrier 10 is moving forward over relatively flat ground surfaces with a relatively light load W being carried thereon, a pushing force applied to the right grip 42R is relatively small an amount of forward displacement of the right grip 42R is relatively small, accordingly. Thus, an output signal from the axial displacement sensor 64 has a level below a predetermined value which is set to activate the control unit 30 for supplying a control signal to the motor 13. In other words, as long as the pushing force applied to the right grip 42R is below a predetermined value required for energizing the motor 13 to produce rotational assist power, the control unit 30 does not produce any control signal to be supplied to the motor 13. Accordingly, no rotational assist power is produced from the motor 13. Under such condition, the hand carrier 10 is hand-carried by the operator M using human power only.

When the operator M lets the hand carrier 10 advance with ascent or with a heavy load carried thereon, the right grip 42R is subjected to a relatively large pushing force. When the pushing force exceeds the predetermined value, the control unit 30 supplies a control signal to the motor 13 for energizing the motor 13 based on an output signal from the displacement sensor 64. The output signal from the displacement sensor 64 varies with the pushing force on the right grip 42R, and the motor 13 is controlled by the control unit 30 to generate corresponding rotational assist power. Thus, human power of the operator M is automatically assisted by assist power produced by the motor 13.

Regardless of whether the hand carrier 10 is advanced only by human power or with the assist of motor power, the operator M has only to continue such a single operation that he or she pushes the left and right grips 42L, 42R while gripping them.

When the hand carrier 10 is to be hand-carried in the backward direction, the operator M lifts up the left and right operation handles 16L, 16R while gripping the left and right grips 42L, 42R of the handlebars 16L, 16R in such a manner that the left and right stands or legs 17L, 17R are floating above the ground surface with a load W carried on the load-carrying platform 18. While keeping this condition, the operator M walks backward so that the hand carrier 10 moves backward.

In this instance, if the load W carried on the hand carrier 10 is heavy or the hand carrier 10 is to be pulled up along a slope, power assist by the motor 13 occasionally becomes necessary. In that case, the operator M turns the control lever 72 clockwise in FIG. 11C by using the thumb FN of the right hand HA while maintaining the grip on the right grip 42R. In response to angular movement of the control lever 72, the angular displacement sensor 81 (FIG. 11A) generates an output signal whose intensity or level is variable with the amount of angular displacement of the control lever 72. Based on the output signal from the angular displacement sensor 81, the controller 30 controls operation of the motor 13 in such a manner that the motor 13 generates assist power proportional to the angular displacement of the control lever 72. Thus, the hand carrier 10 is driven backward by the motor 13. Since the operator M has only to steer the hand carrier 10 while gripping the left and right grips 42L, 42R, a working load on the operator M is very small. The backward traveling speed of the hand carrier 10 increases as the amount of angular displacement of the control lever 72 increases.

It appears from the foregoing description that the right grip (slidable grip) 42R serving as a manually operated forward drive control member and the control lever 72 serving as a manually operated reverse drive control member can be easily manipulated separately and reliably by a single hand HA (right hand in the illustrated embodiment) of the operator M which is engaged in an operation for lifting up the handlebars 16L, 16R with both hands.

In the forward movement of the hand carrier 10, the operator M has only to continue pushing of the grips 42L, 42R because regardless of conditions of the load W and ground surfaces, a necessary power assist can be automatically obtained in response to the forward displacement of the right grip 42R.

In the backward movement of the hand carrier, the operator can obtain a necessary power assist by manipulating the control lever 72 appropriately in view of the underlying conditions, such as the magnitude of load W, ground surface quality and the presence of obstacles.

Thus, the operator M can always handle or maneuver the hand carrier smoothly without suffering undue working load or burden. When considering the drawback of the conventional power-assisted hand carrier previously described, this advantage becomes remarkable especially in the backward movement of the hand carrier 10.

FIGS. 12–15 illustrate modifications of the reverse drive control mechanism according to the present invention.

Figure 12:
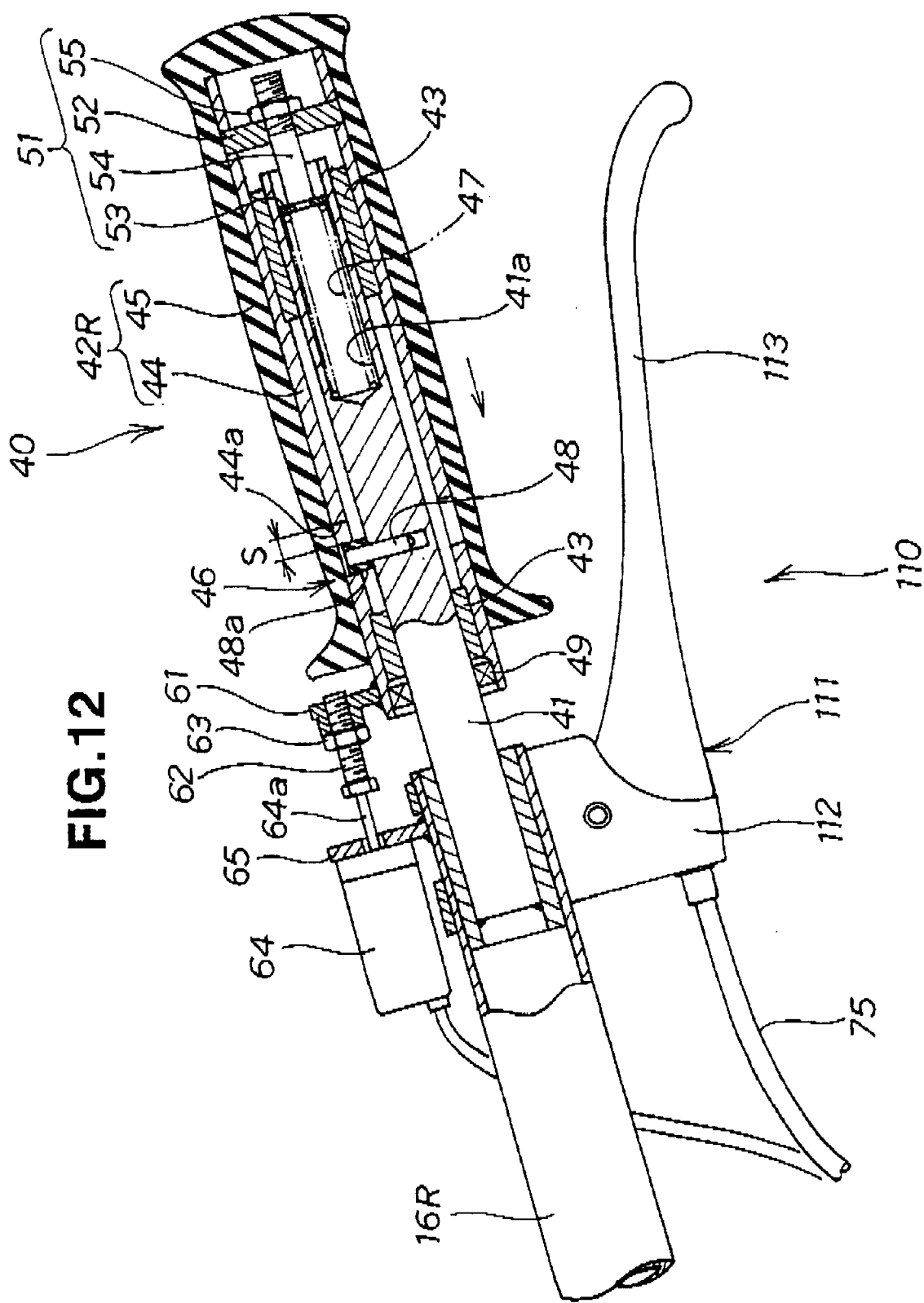
FIG. 12 is a view similar to FIG. 3, but showing a modified form of the reverse drive control mechanism.

A first modified reverse drive control mechanism 110 shown in FIG. 12 includes a control lever mechanism 111 generally comprised of a support lug 112 attached to the distal end of a right operation handle 16R, and a control lever 113 pivotally supported on the support lug 112. The control lever 113 is arranged to extend alongside the right grip 42R so that the control lever 113 can be manipulated by a finger or fingers of an operator's hand while the grip is being gripped by the same hand.

When the operator while gripping the grip 42R pulls the control lever 113 toward the grip 42, the control lever 113 is turned about its pivoted end in the counterclockwise direction shown in FIG. 12. This movement of the control lever 113 causes the throttle wire 75 to be pulled rightward in FIG. 12. When released from the operator's pulling force, the control lever 113 automatically returns t its original neutral position by the action of an auto-return mechanism (not shown). The throttle wire 75 is also pulled leftward in FIG. 12 by means of a similar auto-return mechanism (not shown).

In the reverse drive control mechanism 110, the amount of angular displacement of the control lever 113 is detected by the angular displacement sensor 81 in the same manner as described above with reference to FIGS. 2, 6A, 6B and 7. For the purpose of illustration, a throttle position indicator associated with the control lever 113 of the reverse drive control mechanism 110 is not shown in FIG. 12.

Figure 13:
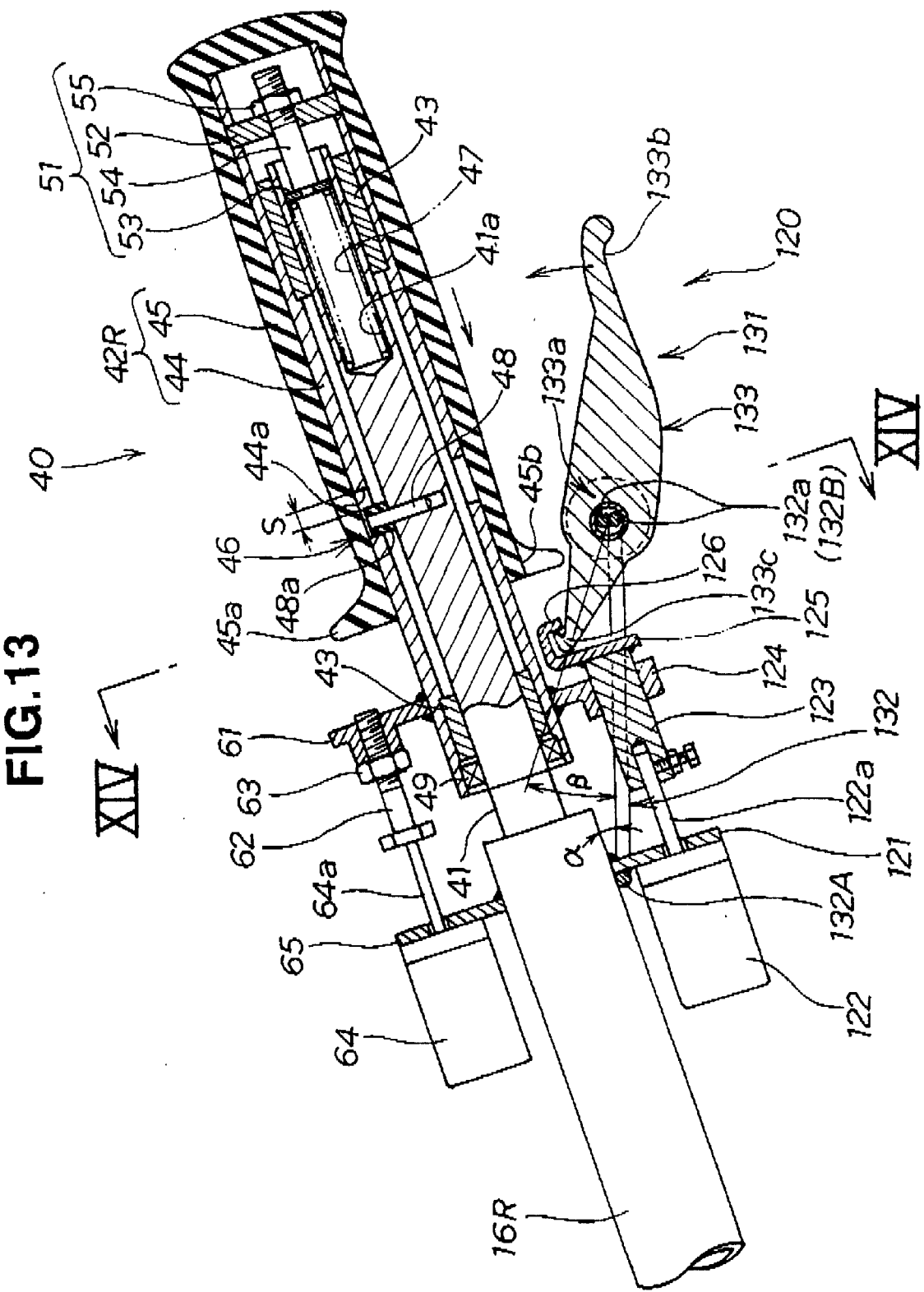
FIG. 13 is a view similar to FIG. 3, but showing another modified form of the reverse drive control mechanism.

FIG. 13 shows a second modified reverse drive control mechanism 120 accordingly the present invention. The reverse drive control mechanism 120 differs from the first modified reverse drive control mechanism 110 shown in FIG. 12 in that it is mounted on the right grip 42R together with the forward drive control mechanism 40. The reverse drive control mechanism 120 generally comprises an angular displacement sensor 122 and a control lever mechanism 131. In FIG. 13, a throttle position indicator associated with the control lever mechanism 131 is omitted for the purpose of illustration.

The angular displacement sensor 122 of the reverse drive control mechanism 120 is supported on a bracket 121 attached by welding to the distal end of the right operation handle 16R in a diametrically opposite relationship with the bracket 65 of the forward drive control mechanism 40. The angular displacement sensor 122 and the axial displacement sensor 64 of the forward drive control mechanism 40 are arrange symmetrically with each other about the longitudinal axis of the operation handle 16R. The control lever mechanism 131 includes a control lever 133 pivotally mounted on the bracket 121 via a resilient hook member 132.

The angular displacement sensor 122 consists of a linear reciprocating potentiometer having a built-in selector switch. The sensor or potentiometer 122 includes a slide rod 122a adapted to move back and forth in the axial direction in response to angular movement of the control lever 133 so that an output signal corresponding in magnitude to the amount of axial displacement of the slide rod 122a which is corresponding to the amount of angular displacement of the control lever 133. The built-in selector switch (not shown) is the same as the selector switch 105 built in the rotary potentiometer (angular displacement sensor) 81 shown in FIG. 2. Other structural and functional details of the angular displacement sensor 122 are the same as those of the angular displacement sensor 81 of FIG. 2 and further description thereof can be omitted.

The slide rod 122a of the sensor 122 projects from body of the sensor 122 toward control lever 133 and extends in parallel spaced relation to the grip 42R. An outer end of the slide rod 122a is connected by a screw (not designated) to one end of an actuating rod 123 which is slidably supported by a support arm 124 projecting from the grip 42R. The other end of the actuating rod 123 is provided with a hook-shaped engagement portion 125.

The resilient hook member 132 has one end 132A hooked on the bracket 121 for pivotal movement toward and away from the right grip 42R. From the end 132A, the resilient hook member 132 extends obliquely downward in the rearward direction of the hand carrier beyond the support arm 124 and terminates an opposite end 132B on which a longitudinal central portion 133a of the control lever 133 is pivotally supported for enabling the the control lever 133 to pivot in the same direction as the hook member 132. The control lever 133 has one end (free end) curved outwardly for facilitating manipulation by a finger or fingers of the operator and another end formed in a hook-shaped engagement nose 133c fitted or engaged in the hook-shaped engagement portion 125 of the actuating rod 123. The hook-shaped engagement nose 133c is angularly offset from the hook member 132 toward the handlebar 16R at an angle β.

Figure 14:
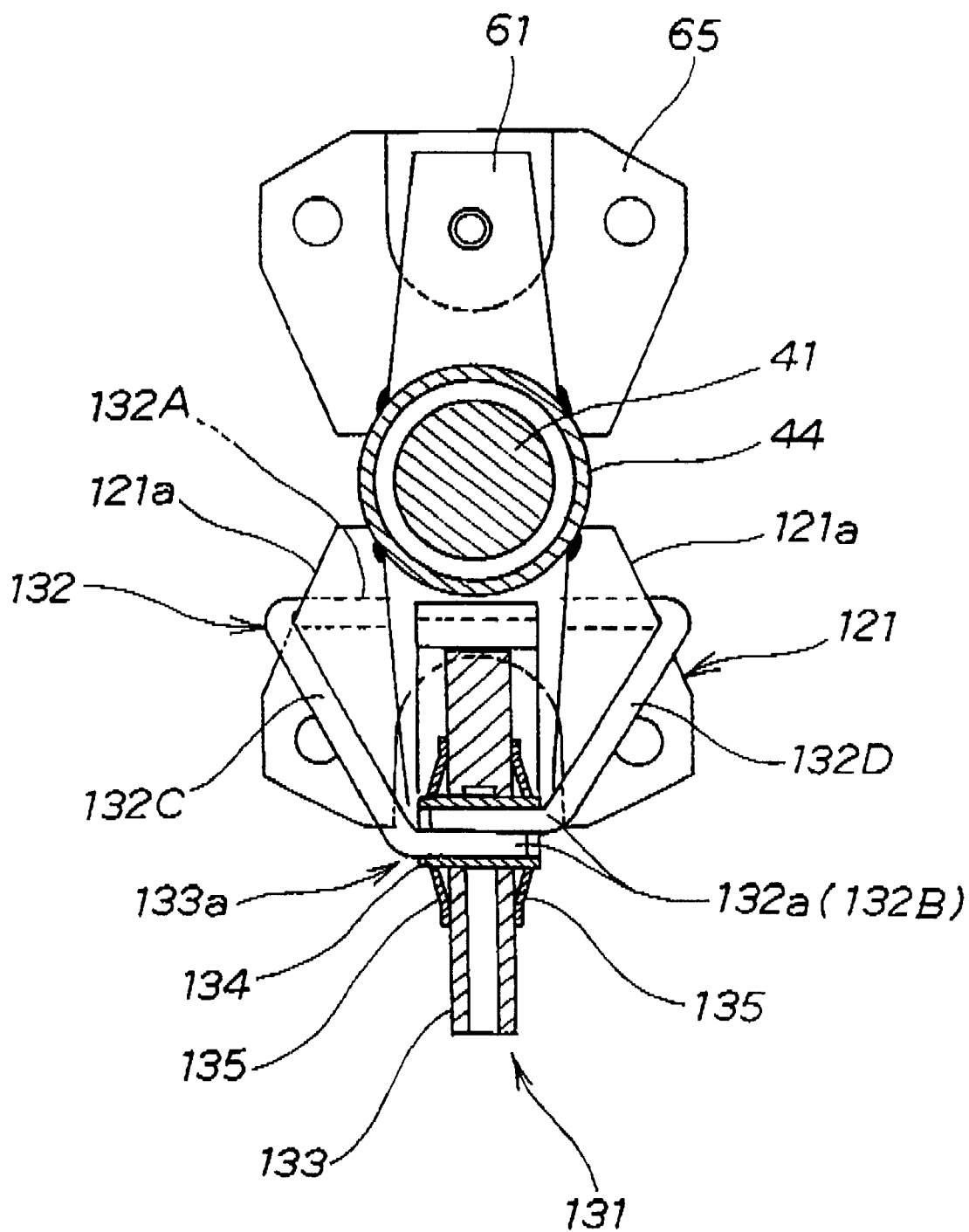
FIG. 14 is a cross-sectional view taken along line XIV—XIV of FIG. 13.

As shown in FIG. 14, the central portion 133a of the control lever 133 includes a hollow shaft or pipe 134 extending through the thickness of the control lever 133, and a pair of stop rings 135, 135 press-fitted with an outer peripheral surface of the pipe 134 on opposite sides of the control lever 133 for locking the pipe 134 in position against removal from the control lever 133. The end 132B of the resilient hook member 132 is composed of opposite free ends 132a, 132a of a single resilient wire, such as a piano wire, bent or folded into a desired shape of the hook member 132. The opposite free ends 132a, 132a are inserted from the opposite directions into the pipe 134 so that the central portion 133 of the control lever 133 is pivotally supported on the opposite ends 132a, 132a of the piano wire bent to form the opposite end 132B of the resilient hook member 132.

Though not shown, the control lever mechanism 131 includes a torsion spring acting between with the opposite bent ends 132a of the hook member 132 and the pipe 134 to urge the control lever 133 to return to its original neutral position shown in FIG. 13.

Figure 15:
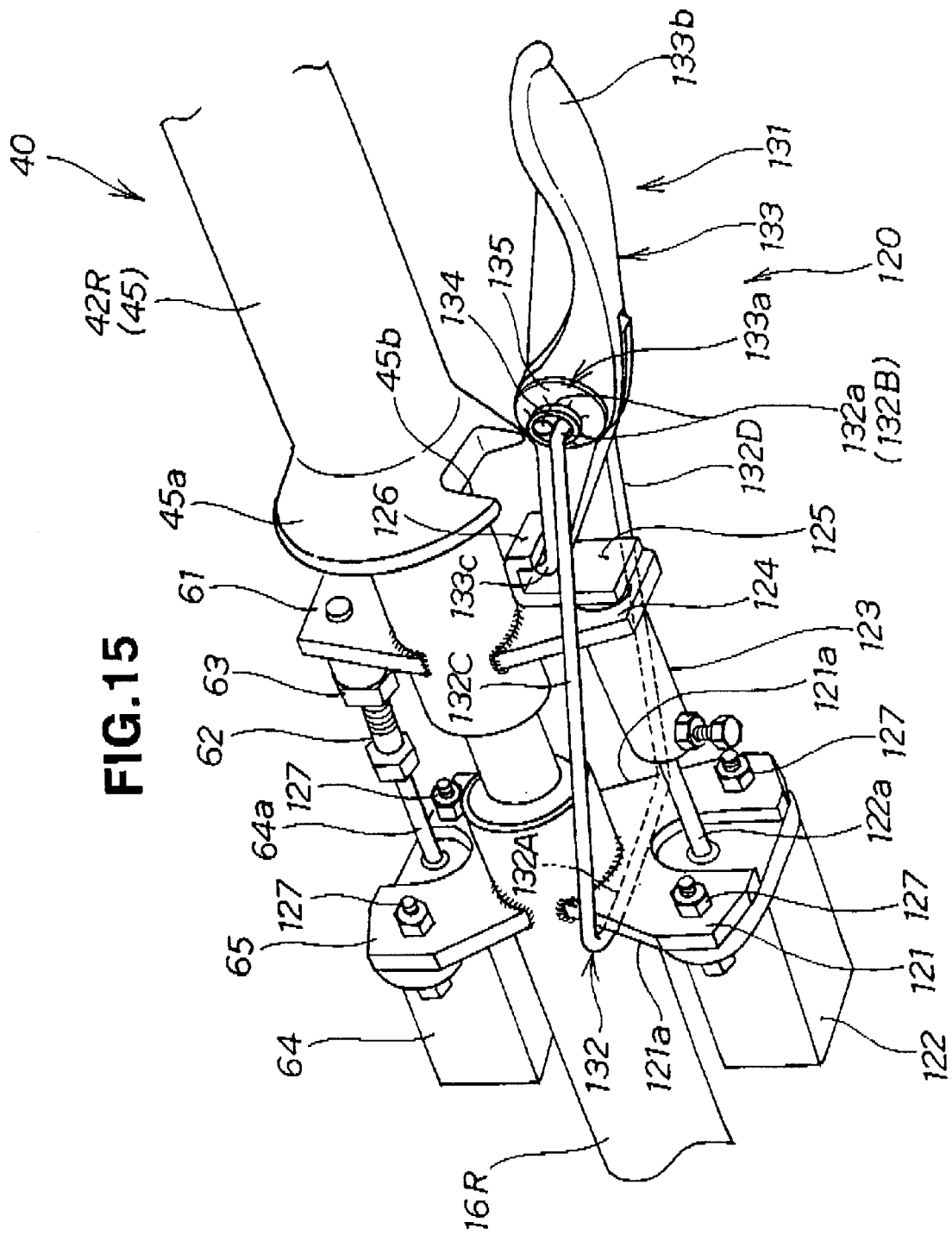
FIG. 15 is a perspective view of the reverse drive control mechanism shown in FIG. 13.

As best shown in FIG. 15, the resilient hook member 132 is formed by bending a single resilient wire into a closed loop having a generally tapered hollow rectangular shape which includes an end forming the hooked end 132A and pair of left and right longitudinal sides 132C, 132D extending from opposite ends of the hooked end 132A and converging into an opposite end 132B formed by overlapped free ends 132a, 132a of the wire.

The tapered rectangular loop-shaped resilient hook member 132 is hooked on the bracket 121 at its flared end (hooked end 132A). The bracket 121 has a pair of left and right side walls 121a, 121a flared downward away from the handlebar 16A. The downwardly flared side walls 121a, 121a are engagable with the opposite longitudinal sides 132c, 132D of the resilient hook member 132 to limit pivotal movement of the hook member 132 in a direction away from the handlebar 16R within an angle α. (FIG. 13). The side walls 121a of the bracket 121 serve as a stopper.

With the pivotal movement of the hook member 132 thus limited within the range of angle α, the hook-shaped engagement nose 133c of the control lever 133 is always held in mutual engagement with a given portion of the hook-shaped engagement portion 125. Consequently, the position of the outwardly curved end portion 133b of the control lever 133 can always move along a given arc of a circle dawn about the pivot axis 132B of the control lever 133.

The hook-shaped engagement portion 125 has an integral stopper 126 engagement with the hook-shaped engagement nose 133c to prevent further pivotal movement of the control lever 133 in the direction away from the handlebar 16R.

The grip 45 has an angular flange 45a at a front end thereof. In order to prevent interference with the control lever 133, a lower portion of the flange 45a is cutout to form a recess 45b.

The angular displacement sensor 122 is attached to the bracket 121 by means of bolt-and-nut fasteners 127. The sensor 122 has an electric circuit structurally and functionally the same the circuit of the angular displacement sensor 81 shown in FIG. 2.

The reverse drive control mechanism 120 of the foregoing construction operates as follows.

The outwardly curved free end portion 133b of the control lever 133 is pulled toward the grip 45 by a finger or fingers of a hand of the operator with the grip 45 being gripped by the operator's hand. The control lever 133 is turned counterclockwise in FIG. 13 about the free end 132B of the hook member 132. This movement causes the hook-shaped engagement nose 133c of the control lever 133 to thrust the hook-shaped engagement portion 125 in a forward direction of the hand carrier (leftward direction in FIG. 13). The thrusting force is transmitted via the actuating rod 123 to the slide rod 122a of the sensor 122 so that the slide rod slides or axially moves a distance equivalent to the amount of angular movement of the control lever 133. The angular displacement sensor 122 produces an output signal corresponding to the amount of axial displacement of the slide rod 122a, so as enable the controller 30 (see FIG. 2) to control operation of the motor 13 (see FIG. 1) in the same manner as described above.

When released from the pulling force, the control lever 133 automatically returns to its original neutral position of FIG. 13 by the action of the non-illustrated automatic return mechanism. Upon arrival of the lever 133 at the neutral position, the output signal from the angular displacement sensor 122 becomes nil.

Although the power-assisted hand carrier shown in the illustrated embodiments takes the form of a motorized wheelbarrow, the present invent invention may be applied to a motorized hand carrier having two wheels. The slidable grip 42R may be provided on the left handlebar 16L. Additionally, the control lever mechanisms 71, 111, 131 may be provided on the left grip 42L. Furthermore, the axial displacement sensor 64 and the angular displacement sensor 81, 122 may be attached to any part of the body frame 11, left handlebar 16L or right handlebar 16R.

Figure 16:
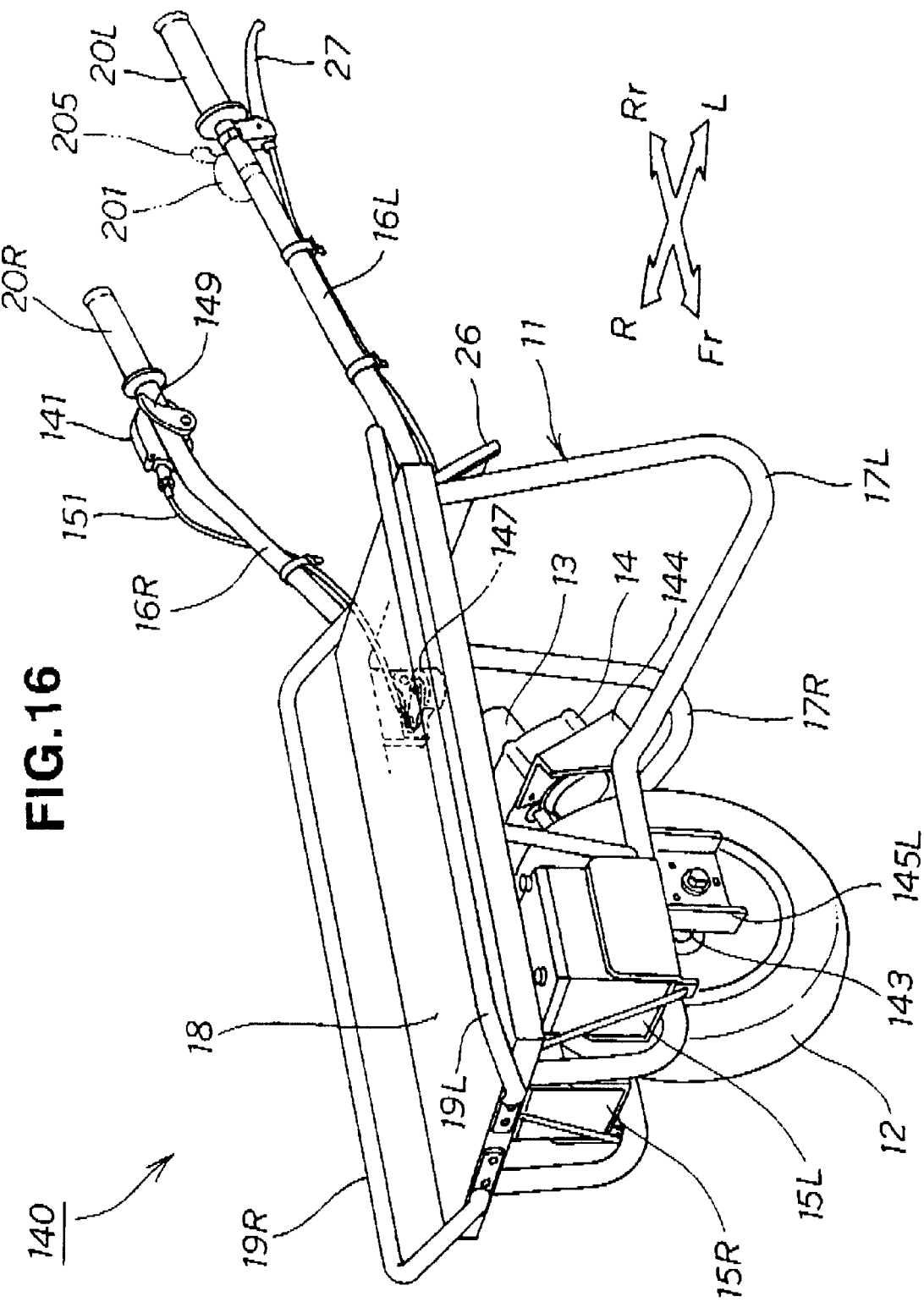
FIG. 16 is a perspective view of a power-assisted hand carrier according to a second embodiment of the present invention.

FIG. 16 shows in perspective a power-assisted hand carrier according to a second embodiment of the present invention.

The power-assisted hand carrier 140 is a motorized wheelbarrow and includes a body frame 11 and a single wheel 12 rotatably supported by the body frame 11 at a transverse central portion of the hand carrier 140. An electric motor 13 for producing rotational power, a power transmission mechanism 14 for transmitting the power of the motor 13 to the wheel 12, and left and right batteries 15L, 15R for supplying electric power to the motor 13 are all mounted on the body frame 11. The hand carrier 140 has a pair of left and right handlebars 16L, 16R extending from a rear end portion of the body frame 11 obliquely upward in a rearward direction of the hand carrier 10, and a pair of left and right support stands 17L, 17R projecting downward from the rear end portion of the body frame 11 for supporting the hand carrier 10 while at rest. A rectangular load-carrying platform 18 is supported by an upper portion of the body frame 11 for carrying a load thereon, and a pair of left and right side rails 19L, 19R is mounted on the load-carrying platform 18 in opposed relation and extending along opposite longitudinal edges of the platform 18.

The power-assisted hand carrier (wheelbarrow) 140 of the foregoing construction can be hand-carried by the operator while the handlebars 16L, 16R are lifted upward to keep the support stands 17L, 17R in a floating condition above the ground surface.

The left handlebar 16L is provided with a hand grip 20L at a distal end thereof. Similarly, the right handlebar 16R is provided with a hand grip 20R at a distal end thereof. A brake lever 27 is provided on the left handlebar 16L. The right handlebar 16R is provided with a manually operated drive control lever mechanism 141.

Figure 17:
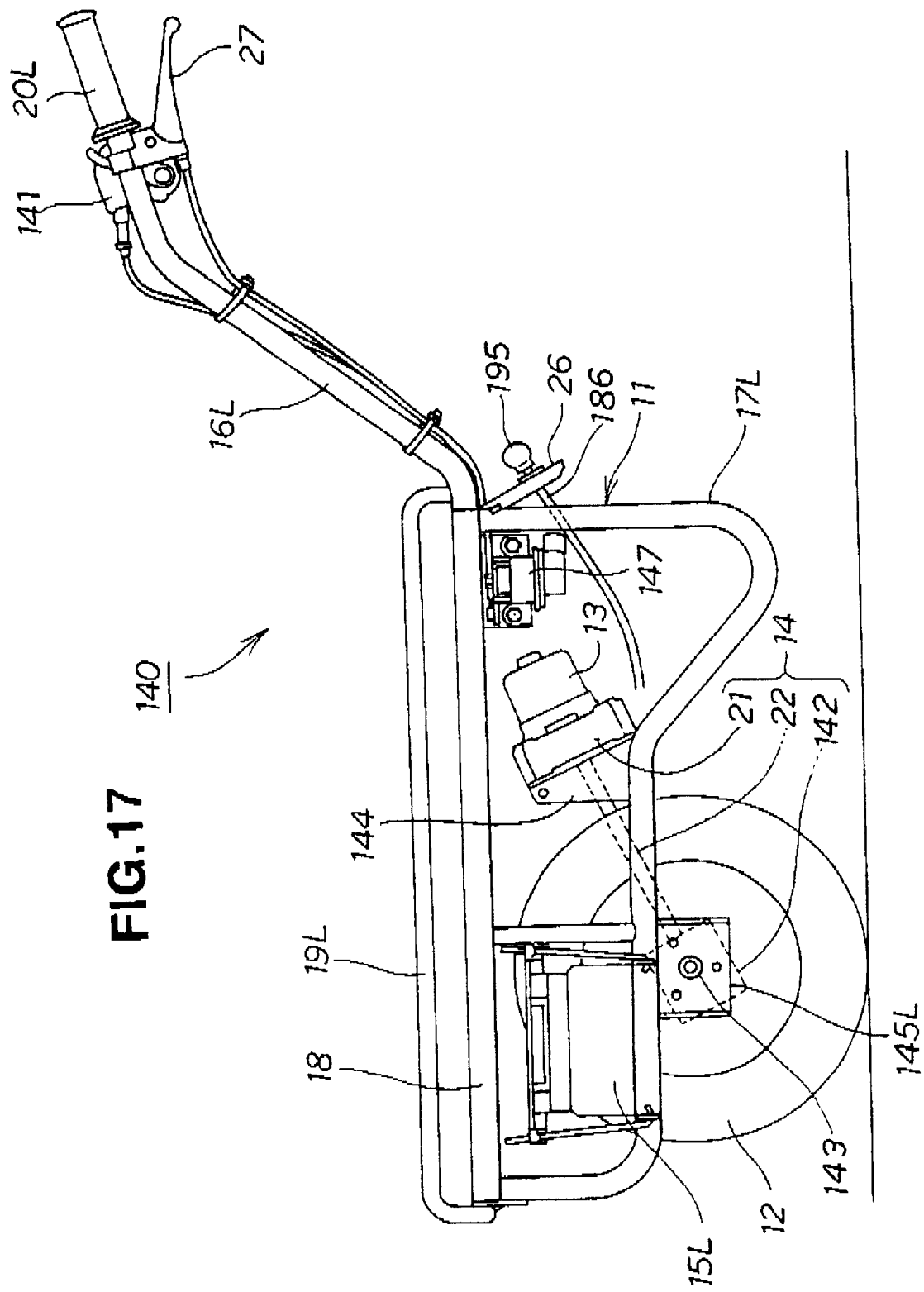
FIG. 17 is a side view of the power-assisted hand carrier shown in FIG. 16.

As shown in FIG. 17, the power transmission mechanism 14 includes a first speed reducer 21 coupled with the motor 13 serving as a drive source, a power transmitting shaft 22 connected at one end to the first speed reducer 21, and a second speed reducer 142 connected to the other end of the power transmitting shaft 22. The power transmission mechanism 14 thus constructed transmits power of the motor 13 via a wheel axle 143 to the wheel 12 serving as a drive wheel.

The first speed reducer 21 reduces speed of rotation of the motor 13, and the second speed reducer 142 provides a further reduction of rotational speed before it is transmitted to the wheel axle 143. The first speed reducer 21 is disposed in the proximity of the motor 13 and the second speed reducer 142 is disposed in the proximity of the wheel 12. The wheel 12 is mounted to the wheel axis 143.

The body frame 11 includes a bracket 144 for mounting the geared motor 13, and left and right brackets 145L, 145R for mounting the second speed reducer 142 and bearing portions described later on.

Figure 18:
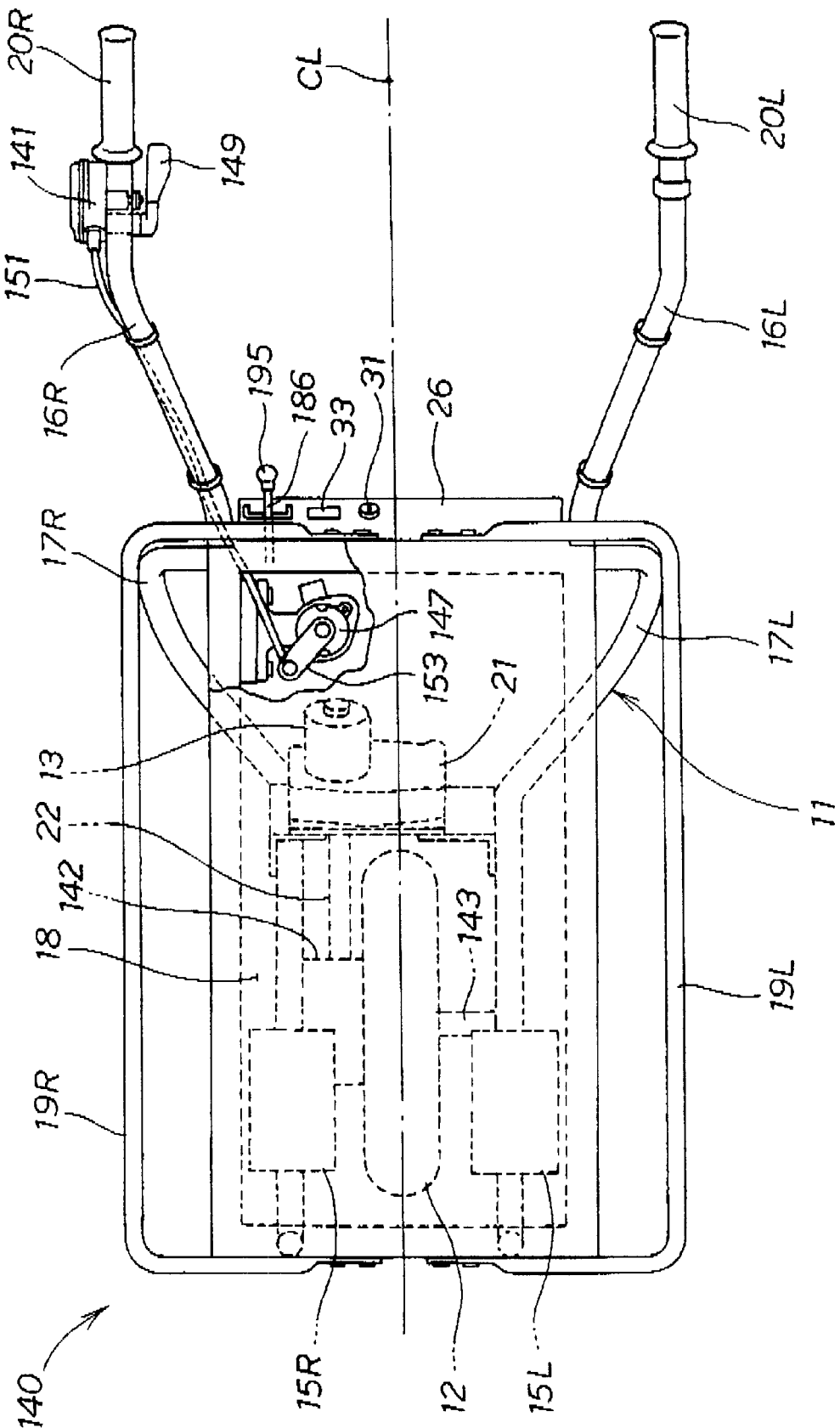
FIG. 18 is a plan view, with part cutaway for clarity, of FIG. 17.

As shown in FIG. 18, the wheel 12 is disposed on a longitudinal centerline CL (at a transverse central portion) of the body frame. The batteries 15L, 15R are disposed on the left and right sides of the body frame 11, and the motor 13 is offset from the longitudinal centerline CL toward the right.

The body frame 11 has an instrument panel 26 attached to the rear end portion thereof. On the instrument panel 26 a key switch 31 and a battery power meter 33 are mounted. A potentiometer 147 is mounted on the body frame 11 below the load-carrying platform 18.

Figure 19A:
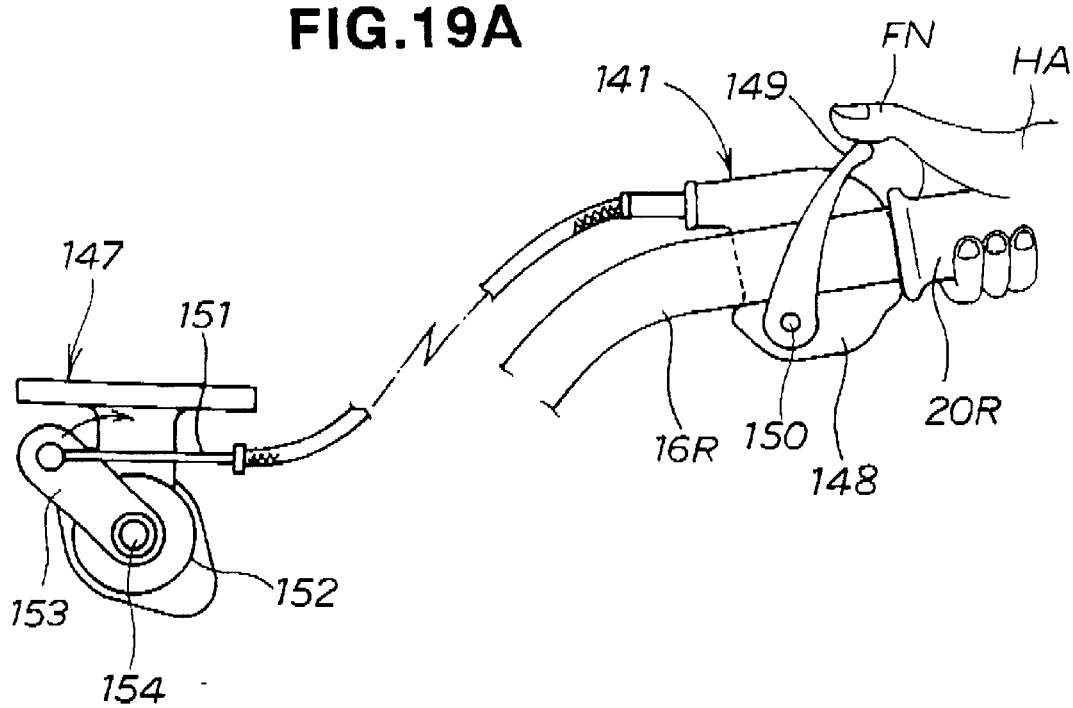
FIGS. 19A and 19B are schematic views showing the positional relationship between a control lever mechanism and an associated potentiometer.
Figure 19B:
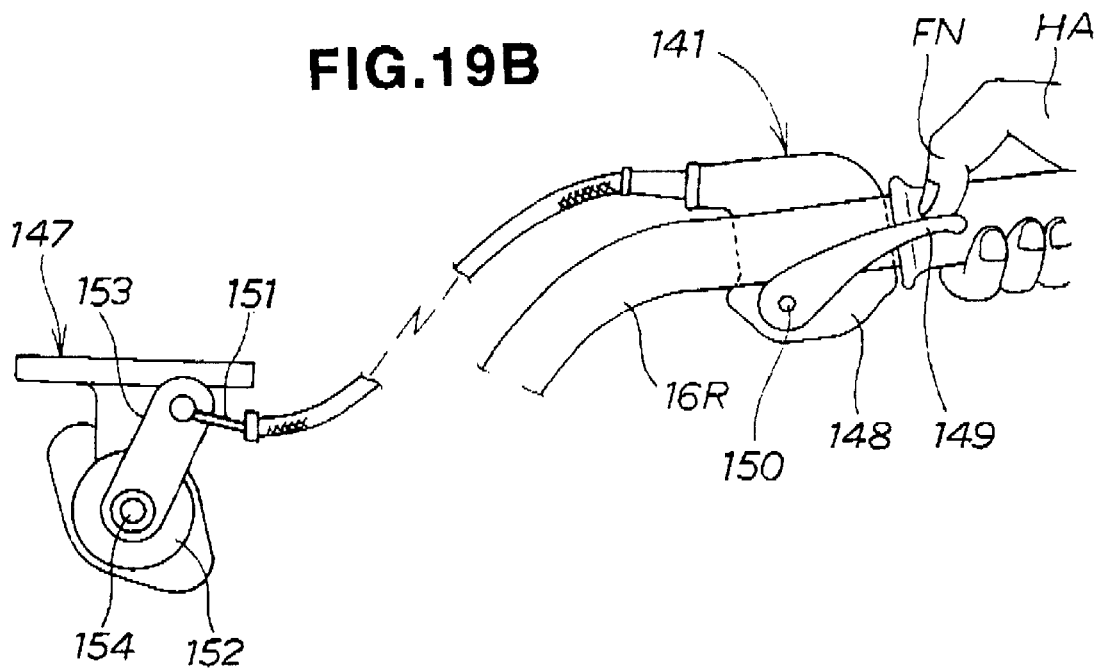

FIGS. 19A and 19B show the structure and operation of the manually operated drive control mechanism 141 and the potentiometer 147.

As shown in FIG. 19A, the manually operated drive control mechanism 141 includes a manually operated control lever 149 attached to a casing 148 via a pivot shaft 15c. The control lever 149 is turned in the clockwise direction by the thumb FN of the right hand HA to pull a throttle wire 151 in the direction from the left to the right in this figure. The manually operated drive control mechanism 141 includes an auto-return mechanism associated with the control lever 149.

The potentiometer 147 is a variable resistor including a rotary shaft 154 by means of which a lever 153 is attached to a casing 152. When the lever 153 is turned by the throttle wire 151, the rotary shaft 154 is rotated to thereby move a slide contact (not shown) contained in the potentiometer 147. The potentiometer 147 includes an auto-return mechanism associated with the rotary shaft 154. The auto-return mechanism has a function to automatically return the rotary shaft 154 to a neutral position. The potentiometer 147 is directly connected to the motor 13 shown in FIG. 16 so that the motor 13 is voltage-controlled based on an output signal from the potentiometer 147.

Using the thumb FN the control lever 149 is turned clockwise from the neutral position of FIG. 19A. This causes the lever 153 of the potentiometer 147 to turn in the clockwise direction whereupon the potentiometer 147 produces a voltage corresponding to the amount of angular displacement of the lever 149. With this angular motion of the lever 149, the voltage suppled to the motor 13 is increased.

Thereafter, the control lever 149 is released from pressure by the thumb whereupon the control lever 149 returns to the position of FIG. 19A by the action of the auto-return mechanism, thereby returning the throttle wire 151 to the original position. As a result, the potentiometer 147 returns to its original neutral position of FIG. 19A by the action of the associated auto-return mechanism. Thus the supply voltage for the motor 13 goes down to zero. The motor 13 is at a stop when the supply voltage is zero and rotates at speeds increasing with an increase in the supply voltage.

Figure 20:
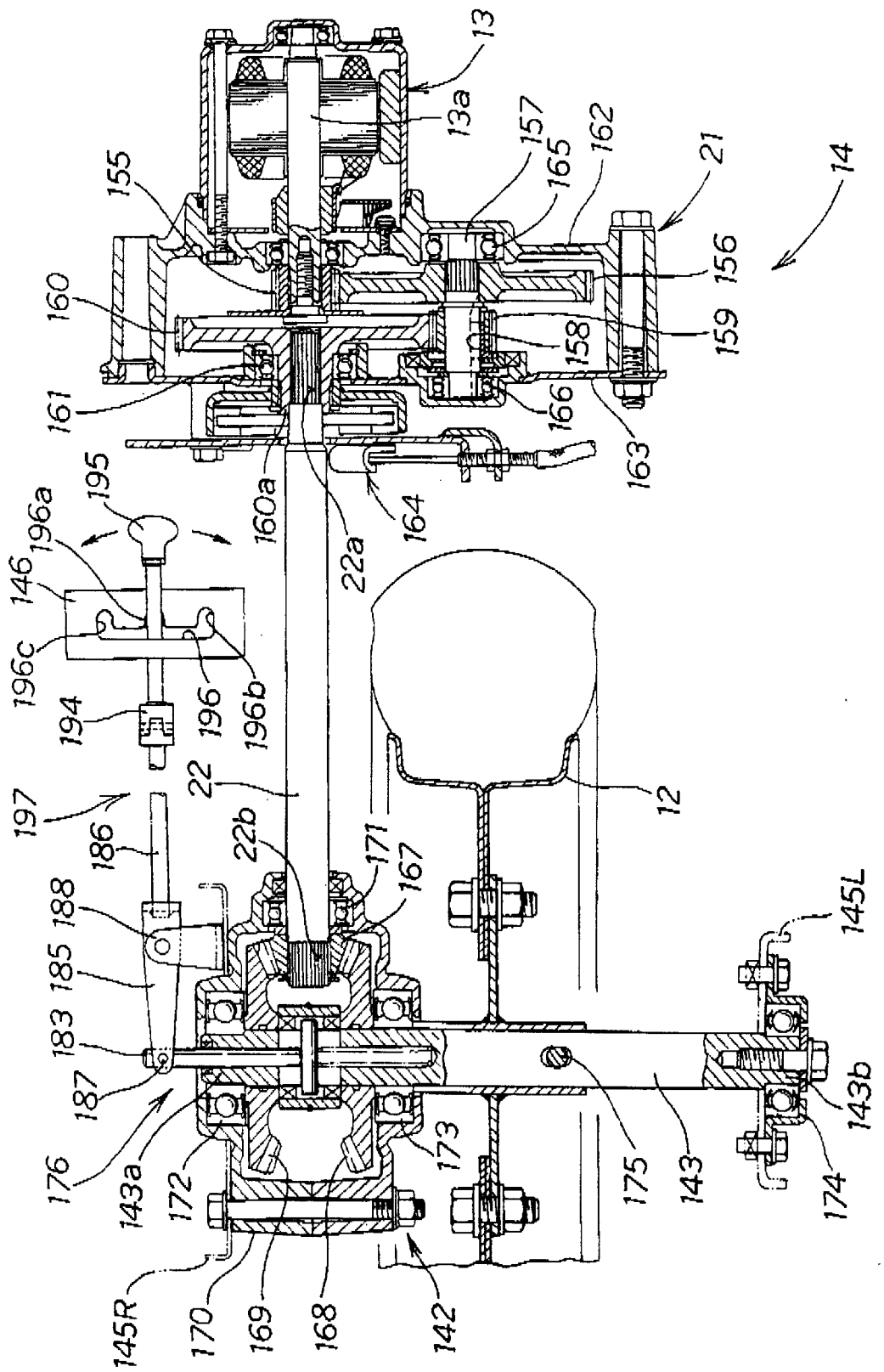
FIG. 20 is a cross-sectional view showing a power transmission mechanism of the hand carrier.

FIG. 20 shows in cross section a joint structure between the first speed reducer 21, power transmitting shaft 22, second speed reducer 142 and wheel axle 143 of the power transmission mechanism.

The first speed reducer 21 includes a first small gear or pinion 155 attached to an output shaft of the motor 13, a first large gear 156 meshing with the pinion 155, an intermediate shaft 157 spline-connected to the first large gear 156, a second small gear 159 releasably engaged with the intermediate shaft 157 via a bidirectional (two-way) clutch 158, a second large gear 160 meshing with the second small gear 159, a ball bearing 161 rotatably supporting the second large gear 160, a housing 162 containing within it the gears 155, 156, 159 and 160, intermediate shaft 157, and bearing 161, and an end cover or bracket 163 closing an open end of the housing 162. The first speed reducer 21 of the foregoing construction is a double-reduction gear mechanism.

The two-way clutch 158 permits transmission of power from the intermediate shaft 157 to the second small gear 159 while the motor 13 is rotating and permits free-wheeling of the second small gear 159 when the motor 13 is stopped. Transmission of power from the second small gear 159 to the intermediate shaft 157 is inhibited. The two-way clutch 158 may be omitted.

The second large gear 160 is spline connected to one end 22a of the power transmitting shaft 22 and has a hub 160a projecting from the housing 162. A brake mechanism 164 is mounted to the hub 160a. In FIG. 20 reference numerals 155 and 166 denote ball bearings rotatably supporting the intermediate shaft 157 on the housing 162 and the end cover 163.

The second speed reducer 142 includes the power transmitting shaft 22 and a wheel axle 143 disposed in a mutually perpendicular relation with each other, a mall bevel gear (drive bevel gear) 167 spline-connected to the other end 22b of the power transmitting shaft 22, two large bevel gears (forward driven bevel gear 168 and reverse driven bevel gear 169) rotatably mounted in face to face on the wheel axle 143 in the proximate of one end 143a of the wheel axle 143, a housing 170 accommodating within it the bevel gears 167–169, a drive shaft bearing 171 rotatably supporting the power transmitting shaft 22 at a portion adjacent to the other end 22b of the power transmitting shaft 22, a first bearing 172 rotatably supporting the one end 143a of the wheel axle 143, and a second bearing 173 rotatably supporting an intermediate portion of the wheel axle 143. The second speed reducer 142 thus constructured is a single-reduction mechanism.

The other end 143 of the wheel axle 143 is rotatably supported on the body frame 11 via a bearing 174 and is connected at an intermediate portion thereof to the wheel 14 by means of a pin 175. The pin-connected wheel 12 and wheel axle 143 are rotatable in unison with each other.

The power transmitting mechanism 14 further includes a forward-reverse changeover mechanism or clutch 167 disposed in the proximity of the wheel axle 143 for mechanically changing over or switching the direction of rotation of the wheel 12 between the forward direction and the backward or reverse direction.

Figure 21:
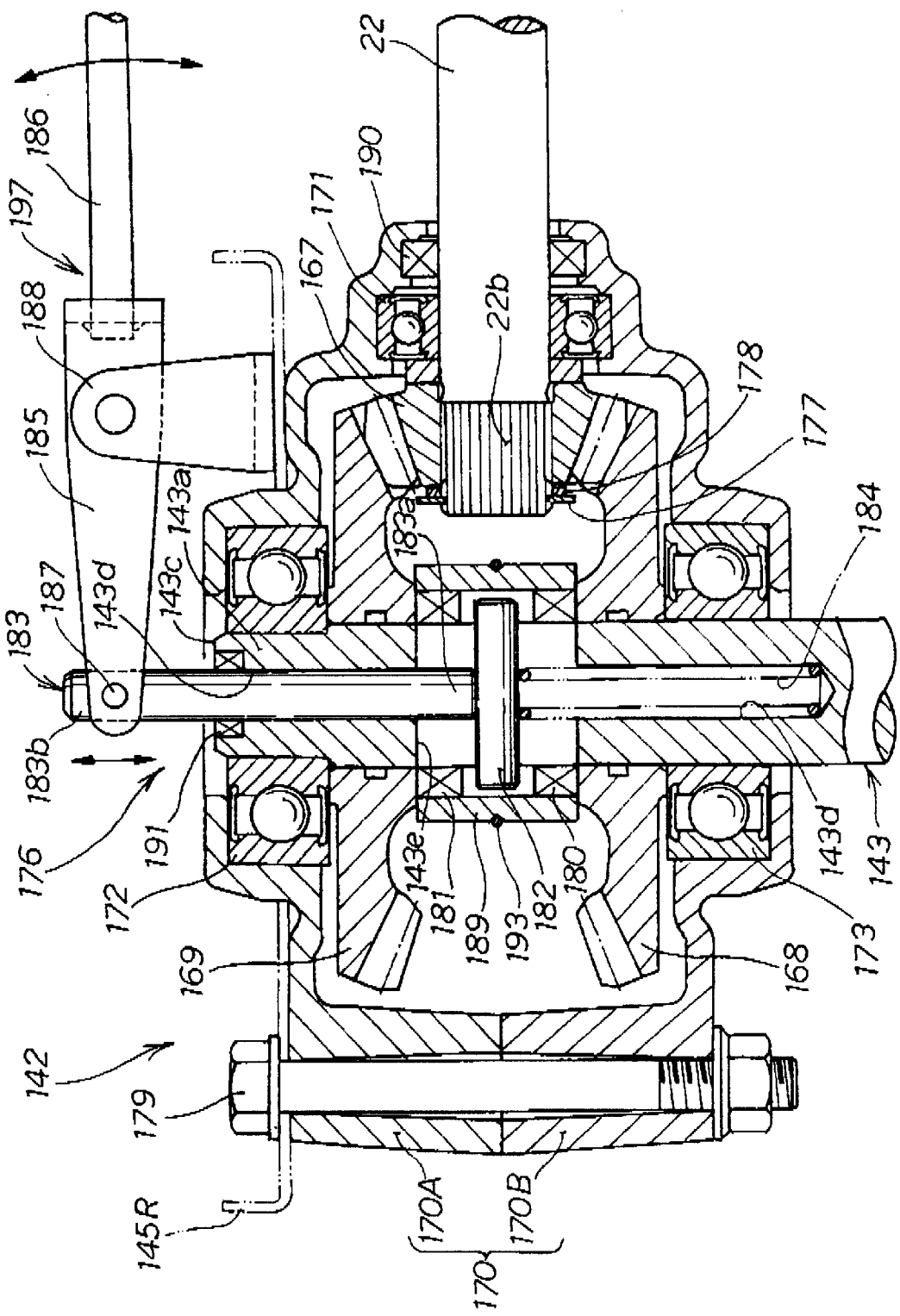
FIG. 21 is a cross-sectional view of a second speed reducer of the power transmission mechanism.

FIG. 21 shows on enlarged scale the internal structure of the second speed reducer 142 shown in FIG. 20. As shown the other end 22b of the power transmitting shaft 22 is connected to the second speed reducer 142 such that it is made immovable in the axial direction by means of a stop ring 177 attached to the shaft end 22b with a thrust washer 178 disposed between the stop ring 177 and the drive bevel gear 167 spline-connected to the shaft end 22b. The end 143a of the wheel axle 143 is axially immovably mounted on the housing 170 using a stepped portion formed between the axle end 143a and a main portion of the wheel axle 143.

The forward and reverse driven bevel gears 168, 169 rotate in mutually opposite directions as they are in driven mesh with a single drive bevel gear 167.

The housing 170 is composed of a pair of symmetrical left and right housing members or halves 170A and 170B assembled together face to face to form a hollow box-like structure. The left and right housing members 170A, 170B are connected together by means of four bolt-and-nut fasteners 179 (only one being shown in FIG. 21). The housing 170 consisting of two symmetrical housing members 170a, 170B makes the assemblage of the second speed reducer 142 easy.

The forward-reverse changeover clutch 176 generally comprises forward clutch teeth 180 formed integrally with the forward driven bevel gear 168, reverse clutch teeth 181 formed integrally with the reverse drive bevel gear 169, a clutch pin 182 selectively engageable with the forward clutch teeth 180 and the reverse clutch teeth 181, a shift rod 183 for actuating the clutch pin 182, and a compression spring (resilient member) 184 resiliently urging the clutch pin 182 toward the shift rod 183.

The wheel axle 143 has an axial hole 143d coaxial with the wheel axle 143 and extending longitudinally from an end face 143c of the axle end 143a toward the other axle end, an a radial guide slot 143e extending radially through a longitudinal intermediate portion of the wheel axle 143. As better shown in FIG. 22, the hole 143d is a blind hole of circular cross section and extends across the radial guide slot 143e. The radial guide slot 143e has an oblong shape in cross section having a major or long axis aligned with the axis of the wheel axle 143. The radial guide slot 143e extends across the axial blind hole 143d.

The clutch pin 182 is a round pin having a length greater than the outside diameter of the wheel axle 143. The clutch pin 182 is slidably received in the radial guide slot 143e so that the clutch pin 182 is movable in the longitudinal direction of the wheel axle 143 and is immovable in the circumferential direction of the wheel axle 143.

The radial guide slot 143e is located intermediately between the forward clutch teeth 180 and the reverse clutch teeth 181. The breadth of the radial guide slot 143e (i.e., an extent of the slot 143e in the axial direction of the wheel axle 143) is determined such that the clutch pin 182 can be engaged with both the forward and reverse clutch teeth 180, 182.

The shift rod 183 is a round rod slidable fitted in the axial blind hole 143d in the wheel axle 143 for reciprocating movement along the axis of the wheel axle 143. An inner end 183a of the shift rod 183 is held in abutment with an outer peripheral surface of the clutch pin 182 as the clutch pin 182 is urged toward the shift rod 183 by means of the compression coil spring 184. An outer end 183b of the shift rod 183 is pivotally connected by a pin 187 to a forked end 185 of a shift lever 186. The forked end 185 of the shift lever 186 is pivotally supported by the housing 170 via a bracket 188.

The compression coil spring 184 is received in a bottom portion of the axial blind hole 143d and urges the clutch pin 182 toward the end 143a of the wheel axle 143.

The forward clutch teeth 180 on the forward driven bevel gear 168 and the reverse clutch teeth 181 on the reverse driven bevel gear 169 are disposed in face to face and are axially spaced from each other by a predetermined distance so that the they 180, 181 are selectively engageable with opposite end portions of the clutch pin 182 projecting in a radial direction from the outer peripheral surface of the wheel axle 143. To make sure that a cylindrical spacer collar 189 is disposed between two opposed surfaces of the forward and reverse drive bevel gears 168, 169. The spacer collar 189 extends around the wheel axis 143 at that portion including the radial guide slot 143e so that removal of the clutch pin 182 from the radial guide slot 143e is prevented by the spacer collar 189.

The spacer collar 189 has a split construction composed of two symmetrical collar halves or members 189A, 189B jointed together by a stop ring 193 snap-fit in a circumferential groove 189a of the spacer collar 189.

In FIG. 21 reference numerals 190 and 191 denote oil seals disposed around the power transmitting shaft 22 and the shift rod 183, respectively.

It is apparent from the foregoing description that the forward-reverse changeover clutch 176 is disposed in the proximity of the wheel axle 143.

Figure 22:
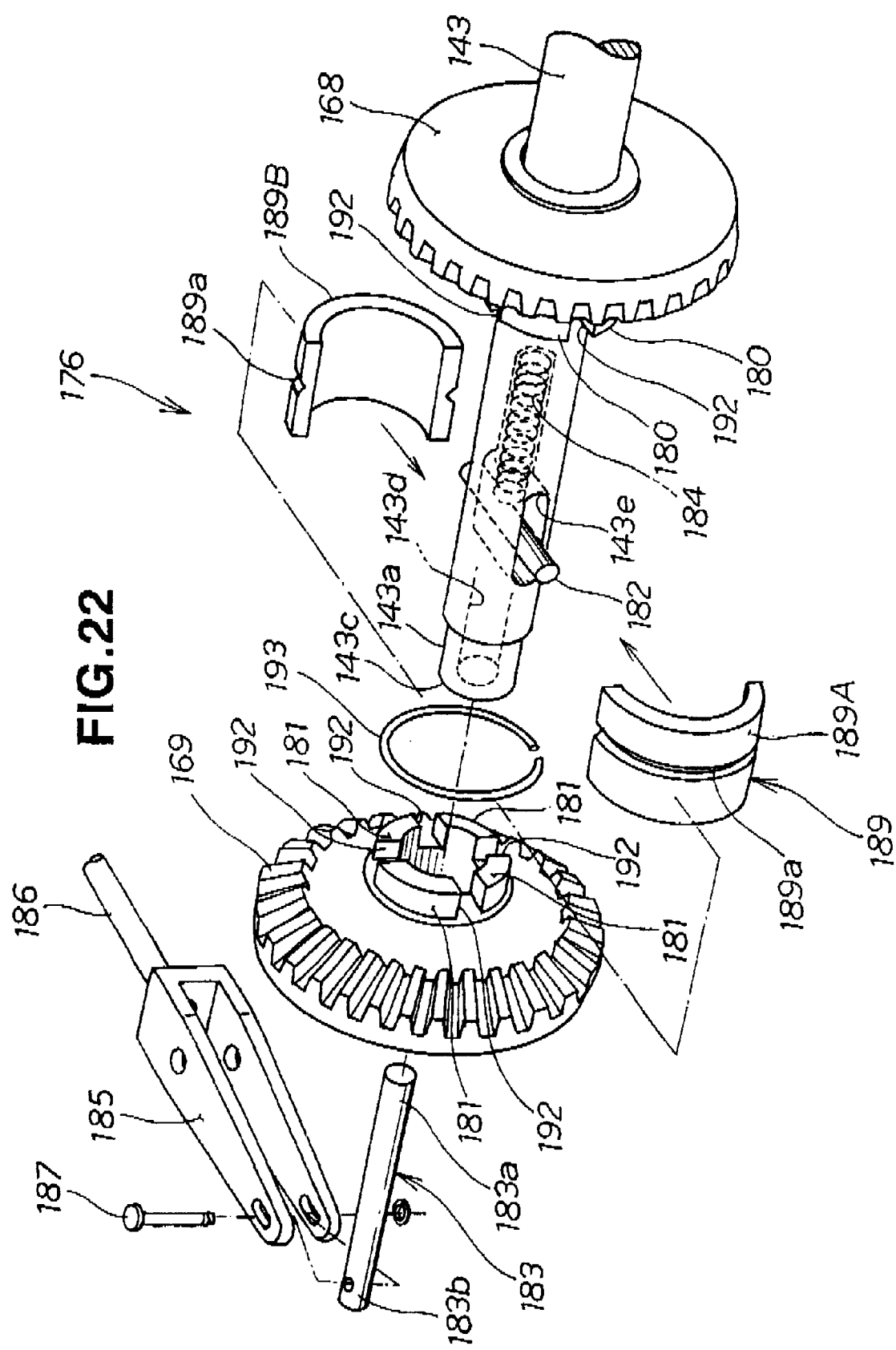
FIG. 22 is an exploded perspective view of a forward-reverse changeover mechanism of the power transmission mechanism.

As shown in FIG. 22, the clutch pin 182 is slidably received in the radial guide slot 143e and is urged by the compression col spring 184 in a direction toward the end 143a of the wheel axle 143.

The number of the reverse clutch teeth 181 is four and such four clutch teeth are arranged concentrically with teeth of the reverse driven bevel gear to form an annular ring. The reverse clutch teeth 181 are circumferentially spaced at equal intervals by radial grooves 192. When the reverse clutch teeth 181 are in mesh with the clutch pin 182, the opposite end portions of the clutch pin 182 are received in two aligned radial grooves 192. The reverse clutch teeth 181 have outer peripheral surfaces slidably fitted with an inner peripheral surface of the spacer collar 189. The forward clutch teeth 180 have the same construction as the reverse clutch teeth 181.

The spacer collar 189 is assembled on the forward and reverse driven bevel gears 168, 169 in a manner as described below.

After the compression coil spring 184 and the clutch pin 182 are assembled in the wheel axle 143, two spacer collar members 189A, 189B are brought together face to face in such a manner as to cover or embrace the wheel axle portion including the radial guide slot 143e. Then, the forward and reverse driven bevel gears 168, 169, which have been mounted on the wheel axle 143, are brought together so that outer peripheral surfaces of the forward and reverse clutch teeth 180, 181 are brought into fitting engagement with an inner peripheral surface of the spacer collar 189, thereby setting the radial position of the spacer collar 189. While holding the spacer collar 189 therebetween, the forward and reverse driven bevel gears are slid along the wheel axle to set the axial position of the spacer collar 189. Finally, the stop ring 193 is snap-fit in the circumferential groove 189a of the spacer collar 189 to thereby join the two collar members 189A, 189B into a unitary structure. The spacer collar 189 doubles in function and serves as a spacer to keep the desired spacing between the forward and reverse driven bevel gears 168, 169 and also as a cover to prevent removal of the clutch pin 182 from the radial guide slot 143e. The assemblage of the spacer collar 189 is easy to perform. By use of the clutch pin 182 movably retained in the radial guide slot 184e of the wheel axle 143 in combination with forward and reverse clutch teeth 180, 181, the forward-reverse changeover clutch 176 as a whole is made simple in construction and can be easily assembled at a low cost.

Referring back to FIG. 20, the shift lever 186 extends in the rearward direction of the hand carrier via a coupling 194 which is constructed to permit axial movement of the shift lever 186 only. The shift lever 186 projects upward from a bracket 146 through a generally E-shaped guide groove 196 formed in the bracket 146. The bracket 146 may be formed as an integral part of the instrument panel 26 (FIGS. 17 and 18). The shift lever 186 has a grip 195 provided on a distal end (upper end) thereof. The E-shaped guide groove 196 have three laterally spaced positions 196a, 196b and 196c, that is a neutral, forward and reverse position, respectively.

The forked end 185, shift lever 186, grip 195, bracket 188, and the guide groove 196 in the bracket 146 jointly form an manually operated actuating mechanism 197 of the forward-reverse changeover clutch 176.

Operation of the forward-reverse changeover clutch 176 will be described with reference to FIGS. 23 to 25.

Figure 23:
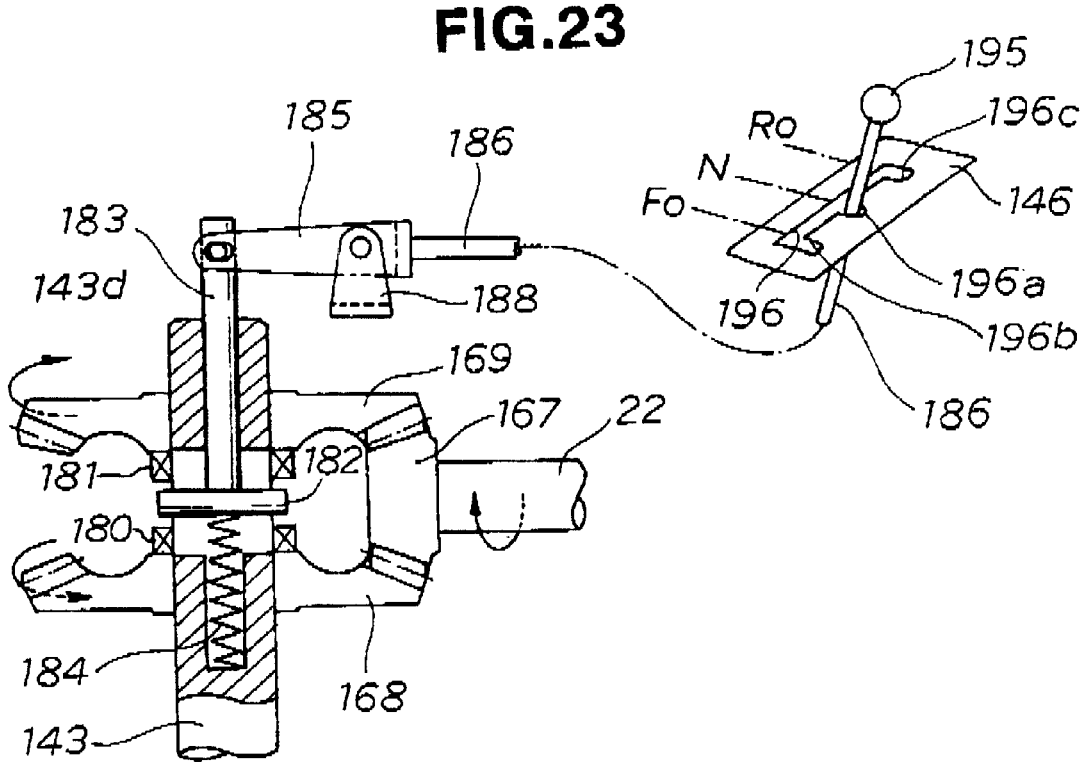
FIGS. 23 to 25 are schematic views showing the operation of the forward-reverse changeover mechanism.

The forward-reverse changeover clutch 176 (FIG. 20) is normally disposed in the disengaged position shown in FIG. 23.

In FIG. 23, the drive bevel gear 167 is rotating always in the clockwise direction as indicated by the arrow. Thus, the forward driven bevel gear 168 is driven to rotate in the counterclockwise direction about the axis of the wheel axle 143 while the reverse driven bevel gear 169 is driven to rotate in the clockwise direction about the axis of the wheel axle 143. The shift lever 186 is disposed in the neutral position 196a so that the shift rod 183 sets the clutch pin 182 in a neutral position where the clutch pin 281 is held out of meshing engagement with both forward and reverse clutch teeth 180, 181. Accordingly, the forward-reverse changeover clutch 167 is in the disengaged or OFF state. In this condition, since rotational power of the motor 13 (FIG. 20) is not transmitted to the wheel axle 143, the hand carrier 147 (FIG. 17) can be hand-carried in the forward and backward directions by the operator using human power only.

Figure 24:
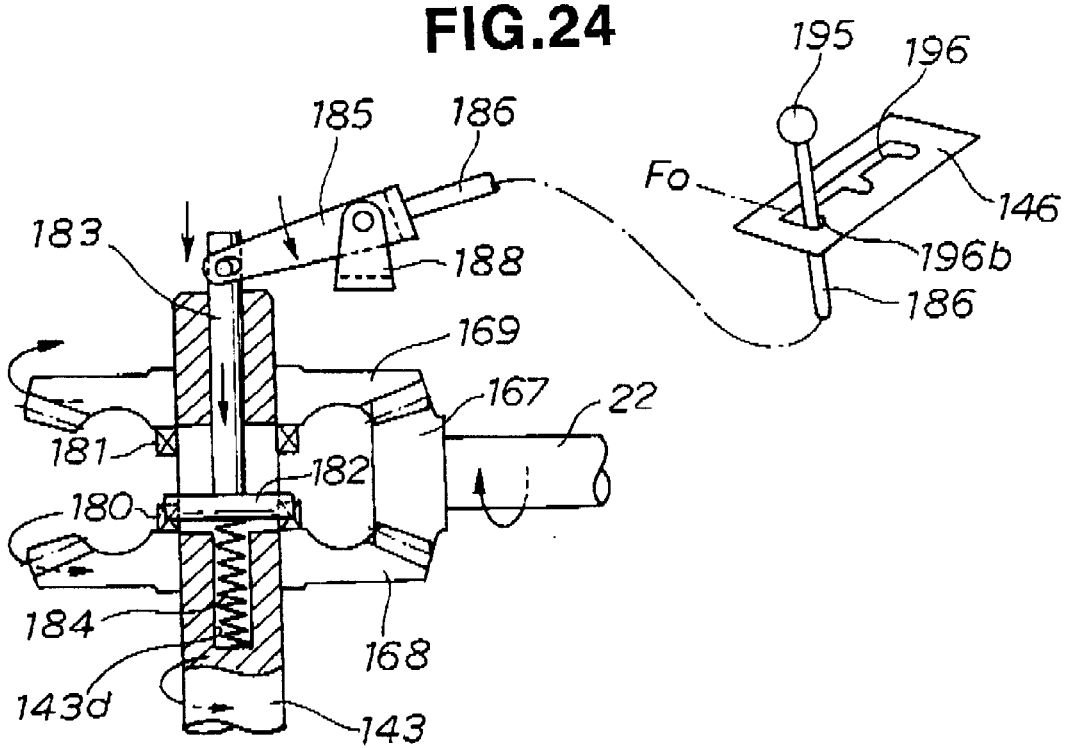

As shown in FIG. 24, when the shift lever 186 is changed from the neutral position 196a to the forward position 196b, the shift rod 183 moves forward to thereby forcibly displace the clutch pin 182 toward the forward driven bevel gear 168 against the force of the compression coil spring 184. The clutch pin 182 thus displaced comes into meshing engagement with the forward clutch teeth 180, thereby activating the forward-reverse changeover clutch 176 in the forward direction. Power, which has been transmitted to the drive bevel gear 167, is transmitted to the wheel axle 143 successively through meshing engagement between the drive and driven bevel gears 167, 168 and meshing engagement between the clutch pin 182 and clutch teeth 180. Thus the wheel axle 143 rotates in the counterclockwise direction (forward direction). The hand carrier 140 is, therefore, driven in the forward direction by the power of the motor 13.

Figure 25:
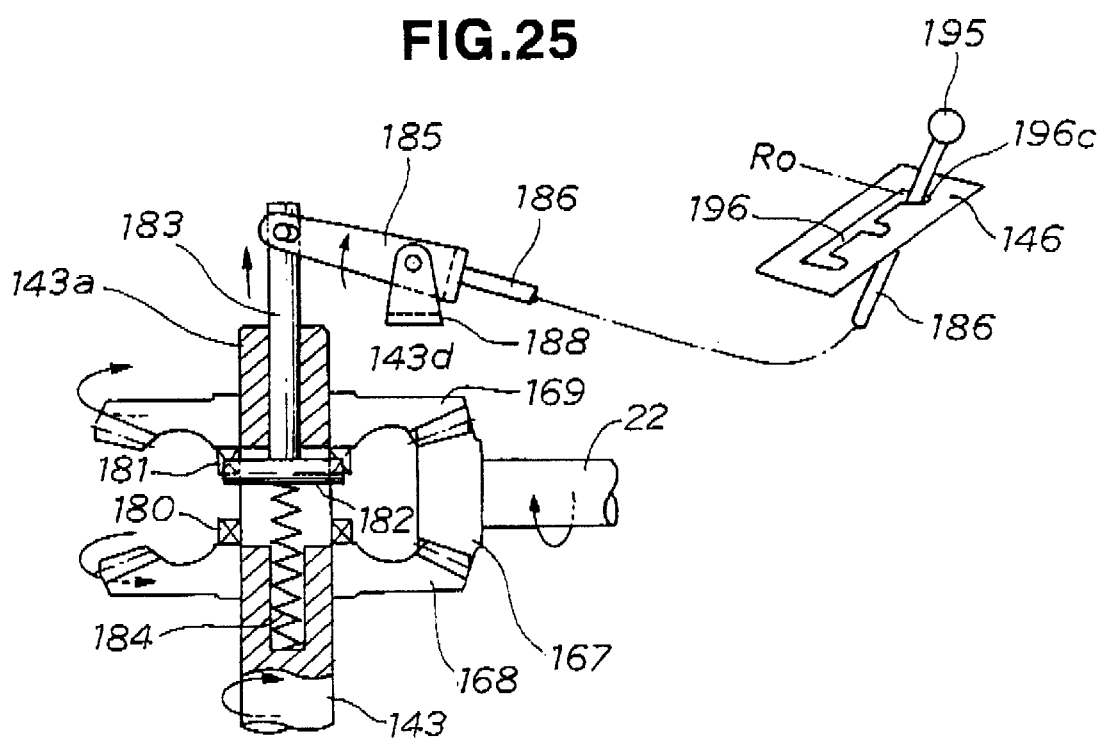

Alternately, when the reverse position 146c is selected by the shift lever 186, as shown in FIG. 25, the shift rod 183 moves backward, allowing the clutch pin 182 is displaced toward the reverse driven bevel gear 169 by the force of the compression coil spring 184. Thus, the clutch pin 182 is brought into meshing engagement with the reverse clutch teeth 181 to thereby activate the forward-reverse changeover clutch 176 in the reverse direction. Power from the motor 13 is transmitted from the drive bevel gear 167 to the wheel axle 143 successively through meshing engagement between the drive and driven bevel gears 167, 169 and meshing engagement between the clutch pin 182 and clutch teeth 181. Thus the wheel axle 143 rotates in the clockwise direction (reverse direction). The hand carrier 140 is, therefore, driven in the backward direction by the power of the motor 13.

Figure 26:
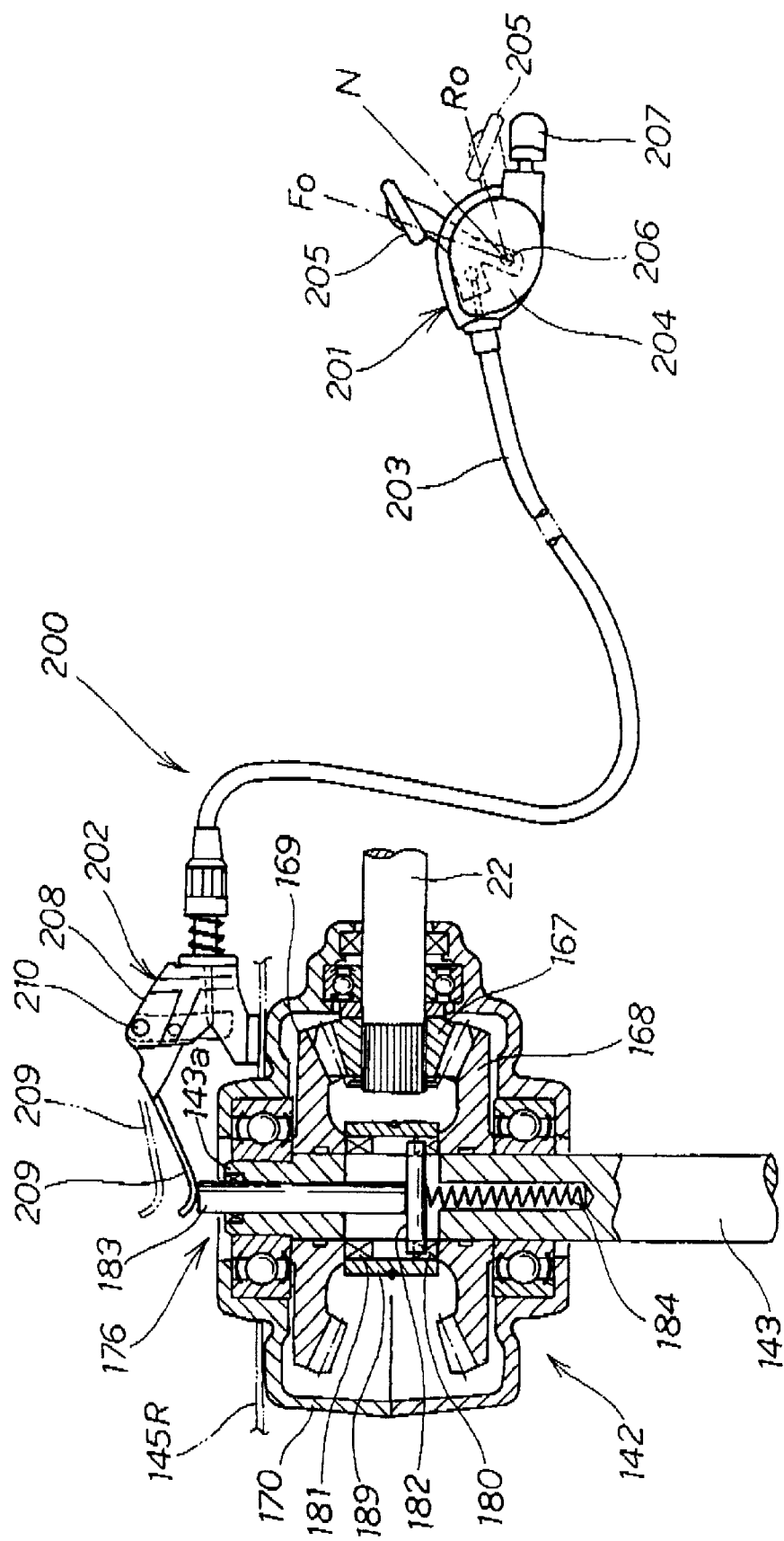
FIG. 26 is a schematic view, with parts shown in cross section, of a modified form of the forward-reverse changeover mechanism.

FIG. 26 shows a modified form of the manually operated actuating mechanism of the forward-reverse changeover clutch 176.

The modified actuator mechanism 200 includes a manually operated clutch control lever mechanism 201 designed to be manipulated by a finger or fingers of the operator, and a crank mechanism 202 designed to transmit operation of the clutch control lever mechanism 201 to the shift rod 183 for causing reciprocating movement of the shift rod 183 in a desired direction. The clutch control lever mechanism 201 and the crank mechanism 202 are operatively connected together by a crank wire 203.

The clutch control lever mechanism 201 includes a clutch control lever 205 pivotally mounted to a casing 204 by means of a pivot pin 206. The lever 205 is connected to one end of the crank wire 203. The lever 205 is adapted to be manipulated by the thumb, and when it is depressed by the thumb to turn clockwise about the pivot pin 206, and crank wire 203 is pulled toward the clutch control lever mechanism 201. The lever 205 is normally disposed in a neutral position N. To this end, the control lever mechanism 201 includes an auto-return mechanism (not shown) associated with the control lever 205 to urge the latter into the neutral position N. The clutch control lever mechanism 201 may be mounted to the left handlebar 20L as indicated by the phantom lines shown in FIG. 17.

The crank mechanism 202 includes a bell crank 209 mounted to a case or housing 208 by means of a pivot pin 210. One arm of the bell crank 209 is connected to the other end of the crank wire 203, and the other arm is held in abutment with the outer end (rearward end) of the shift rod 183. Thus, when the bell crank 209 is turned by the crank wire 203 in the counterclockwise direction about the pivot pin 210, the shift rod 183 is advanced against the force of the compression coil spring 184. Alternatively, when crank wire 203 causes the bell crank 209 to turn clockwise about the pivot pin 210, the shift rod 183 is allowed to move backward by the force of the compression coil spring 184. Like the clutch control lever mechanism 201, the crank mechanism 202 is provided with an auto-return mechanism (not shown) associated with the bell crank 209 to urge the latter to a neutral position (corresponding to the position shown in FIG. 23).

In FIG. 26 these parts which like or correspond to those in the embodiment shown in FIG. 20 are designated by the same reference characters, and no further description is necessary.

When the clutch control lever 207 is turn counterclockwise about the pivot pin 206 to assume a forward position FO, as indicated by the solid lines shown in FIG. 26, the bell crank 209 is turned in the same direction to assume the solid-lined forward position. With this angular movement of the bell crank 209, the shift rod 183 is advanced against the force of the compression coil spring 184 until the clutch pin 182 is engaged with the forward crack teeth 182. Thus the forward-reverse changeover clutch 176 is activated in the forward direction. In this instance, since the wheel axle 143 rotates in the counterclockwise direction (forward direction), the hand carrier (not shown but the same as one 140 shown in FIG. 16) is driven in the forward direction by the power of the motor 13.

Alternately, when the clutch control lever 205 is turned clockwise by the thumb until it assume a reverse position RO indicated by the phantom lines shown in FIG. 26, the bell crank 209 is turned clockwise by the crank wire 203 and assumes a phantom-lined reverse position. Clockwise movement of the bell crank 209 allows the shift rod 183 to move backward by the force of the compression coil spring 184 until the clutch pin 182 is engaged with the reverse clutch teeth 181. Thus the forward-reverse changeover clutch 176 is activated in the reverse direction. In this instance, since the wheel axle 143 rotates in the clockwise direction (reverse direction), the hand carrier is driven in the backward direction by the power of the motor 13.

The drive source should by no means be limited to the electric motor as in the illustrated embodiments but may include an engine. Additionally, the compression coil spring used in the illustrated embodiments for urging the clutch pin may be replaced with any other suitable resilient member.

As described above, since the power transmitting mechanism for transmitting rotational power of a drive source such as motor to a wheel includes a forward-reverse changeover clutch arranged to mechanically switch rotating direction of the wheel between the forward direction and the reverse direction, rotational power in either direction can be transmitted via the changeover clutch to the wheel even when an output shaft of the motor is always rotating in one direction only.

Since rotation of the motor is not reversed, a starting load on the motor is relatively small. This may allow the use of a relatively inexpensive, small-capacity motor in combination with a simple and inexpensive electric control system. The forward-reverse changeover clutch disposed in the proximity of the wheel axle does never cause substantial enlargement of the overall size of the hand carrier and deterioration of maneuverability of the hand carrier.

Obviously, various minor changes and modifications of the present invention are possible in the light of the above teaching. It is therefore to be understood that within the scope of the appended claims, the present invention may be practiced otherwise than as specifically described.

What is claimed is:

1. A power-assisted wheelbarrow, comprising:

a body frame;

a load-carrying platform supported by an upper portion of said body frame;

a pair of left and right handlebars extending from a rear portion of said body frame obliquely upward in a rearward direction of said wheelbarrow;

a single wheel rotatably supported by said body frame at a transverse central portion of the wheelbarrow;

a power unit mounted on said body frame for producing rotating power, said power unit being operatively connected with said wheel such that said wheel is rotated by the rotating power; and a controller for controlling operation of said power unit to change the direction and intensity of the rotating power so that said wheel can be driven in both forward and backward directions at a variable speed;

wherein said controller includes a manually operated forward drive control member provided on a distal end portion of one of said handlebars for enabling said power unit to operate in such a manner as to produce necessary power assist for moving said wheelbarrow in a forward direction, and a manually operated reverse drive control member provided on the distal end portion of said one handlebar for enabling said power unit to operate in such a manner as to produce power for driving said wheelbarrow in a backward direction;

wherein said manually operated forward drive control member is a slidable grip slidably mounted on the distal end portion of said one handlebar and movable in the forward direction in response to a forward thrust applied to said slidable grip, and said manually operated reverse drive control member is a manually operated reverse drive control lever pivotally mounted on said one handlebar in the proximity of said slidable grip; and wherein said controller further includes a first displacement sensor mounted on one of said one handlebar and said body frame for detecting a forward displacement of said slidable grip and producing an output signal corresponding to the detected forward displacement of said slidable grip, and a second displacement sensor mounted on one of said one handlebar and said body frame for detecting an angular displacement of said manually operated reverse drive control lever and producing an output signal corresponding to the detected angular displacement of said manually operated reverse drive control lever, and wherein said power unit produces said power assist based on said output signal from said first displacement sensor and also produces said driving power based on said output signal from said second displacement sensor.

2. A power-assisted wheelbarrow according to claim 1; wherein said first displacement sensor is a linear reciprocating potentiometer mounted on said one handlebar in the proximity of said slidable grip and having a slide rod directly connected to said slidable grip for undergoing reciprocating movement in unison with said slidable grip.

3. A power-assisted wheelbarrow according to claim 1; wherein said second displacement sensor is a potentiometer having a built-in selector switch for selecting one of said output signal from said first displacement sensor and said output signal from said second displacement sensor for the control of operation of said power unit, said selector switch being normally disposed in a position such that the output signal from said first displacement sensor is selected.

4. A power-assisted wheelbarrow according to claim 3; wherein said potentiometer is a rotary potentiometer mounted on said body frame and having a rotary shaft operatively connected to said manually operated reverse drive control lever to rotate in response to pivotal movement of said manually operated reverse drive control lever.

5. A power-assisted wheelbarrow according to claim 3; wherein said potentiometer is a linear reciprocating potentiometer mounted on said one handlebar and having a slide rod operatively connected to said manually operated reverse drive control lever to reciprocate in response to pivotal movement of said manually operated reverse drive control lever.

6. A power-assisted wheelbarrow according to claim 1; wherein said power unit includes a drive source for producing rotational power, and a power transmitting mechanism for transmitting the rotational power from said drive source to said single wheel, said power transmitting mechanism including a forward-reverse changeover clutch disposed in the proximity of an axle of said single wheel for mechanically switching rotating direction of said single wheel between the forward direction and the reverse direction.

7. A power-assisted wheelbarrow according to claim 6; wherein said forward-reverse changeover clutch includes:
   a forward driven bevel gear and a reverse driven bevel gear rotatably mounted in a face-to-face relation on said axle;
   a drive bevel gear rotatably driven by said drive source and being in mesh with said forward and reverse driven bevel gears;
   forward clutch teeth formed on a surface of said forward driven bevel gear facing said reverse driven bevel gear;
   reverse clutch teeth formed on a surface of said reverse driven bevel gear facing said forward driven bevel gear;
   a clutch pin movably received in a longitudinal intermediate portion of said axle such that said clutch pin is movable along the axis of said axle with its opposite end portions projecting from said axle in a radial outward direction;
   a resilient member urging said clutch pin toward one end of said axle;
   said axle having an axial blind hole coaxial with said axle and extending from said one end toward the other end of said axle; and
   a shift rod slidably fitted in said blind hole and having an inner end held in abutment with an outer peripheral surface of said clutch pin by the action of said resilient member, said shift rod being adapted to be manually reciprocated to move said opposite end portions of said clutch pin selectively into meshing engagement with said forward clutch teeth or said reverse clutch teeth.

8. A power-assisted wheelbarrow according to claim 7; wherein said axle has a radial guide slot extending radially through said longitudinal intermediate portion of said axle and slidably receiving said clutch pin, and a spacer collar is disposed between said surfaces of said forward and reverse driven bevel gears and extends around said longitudinal intermediate portion of said to prevent removal of said clutch pin from said radial guide slot.

9. A power-assisted wheelbarrow according to claim 1; wherein the first displacement sensor comprises a linear reciprocating potentiometer mounted on the one handlebar in the proximity of the slidable grip and having a slide rod directly connected to the slidable grip for undergoing reciprocating movement in unison with the slidable grip, the second displacement sensor is a potentiometer having a built-in selector switch for selecting one of the output signal from the first displacement sensor and the output signal from the second displacement sensor and the control of operation of the power unit, the selector switch being normally disposed in a position such that the output signal from the first displacement sensor is selected; and wherein the power unit includes a drive source for producing rotational power, and a power transmitting mechanism for transmitting the rotational power from said drive source to said wheel, said power transmitting mechanism including a forward-reverse changeover clutch disposed in the proximity of an axle of said wheel for mechanically switching rotating direction of said wheel between the forward direction and the reverse direction.

10. A power-assisted wheelbarrow according to claim 9; wherein said forward-reverse changeover clutch includes:
   a forward driven bevel gear and a reverse driven bevel rotatably mounted in a face-to-face on said axle;
   a drive bevel gear roatatbly driven by said drive source and being in mesh with said forward and reverse driven bevel gears;
   forward clutch teeth formed on a surface of said forward driven bevel gear facing said reverse driven bevel gear;
   reverse clutch teeth formed on a surface of said reverse driven bevel gear facing said forward driven bevel gear;
   a clutch pin movably received in a longitudinal intermediate portion of said axle such that said clutch pin is movable along the axis of said axle with its opposite end portions projecting from said axle in a radial outward direction;
   a resilient member urging said clutch pin toward one end of said axle;
   said axle having an axial blind hole coaxial with said axle and extending from said one end toward the other end of said axle;
   a shift rod slidably fitted in said blind hole and having an inner end held in abutment with an outer peripheral surface of said clutch pin by the action of said resilient member, said shift rod being adapted to be manually reciprocated to move said opposite end portions of said clutch pin selectively into meshing engagement with said forward clutch teeth or said reverse clutch teeth.

11. A power-assisted wheelbarrow according to claim 10; wherein said axle has a radial guide slot extending radially through said longitudinal intermediate portion of said axle and slidably receiving said clutch pin, and a spacer collar is disposed between said surfaces of said forward and reverse driven bevel gears and extends around said longitudinal intermediate portion of said axle to prevent removal of said clutch pin from said radial guide slot.

12. A power-assisted material transport apparatus, comprising: a frame; a load-carrying platform mounted on the frame; a wheel rotatably attached to the frame; a motor supported by the frame for rotating the wheel; a hand-controlled steering mechanism for steering the apparatus; a controller for controlling a direction and intensity of a rotating force of the motor; a slidable grip slidably mounted on the steering mechanism to slide in a forward direction in response to a forward thrust applied to the slidable grip; a linear displacement sensor for producing an output signal in accordance with the forward thrust applied to the slidable grip for controlling the magnitude of the rotating force of the motor in a forward direction; a manually operated lever pivotally mounted to the steering mechanism for controlling the direction of the rotating force of the motor in the forward and reverse directions; and an angular displacement sensor for producing an output signal in accordance with the angular displacement of the lever for controlling the direction of the rotating force of the motor in the forward and reverse directions, the angular displacement sensor comprising a potentiometer and a build-in selector switch for selecting one of the output signal from the linear displacement sensor and the output signal from the angular displacement sensor for the control of operation of the motor, the selector switch being normally disposed in a position such that the output signal from the linear displacement sensor is selected.

13. A power-assisted material transport apparatus according to claim 12; wherein the potentiometer is a rotary potentiometer mounted on the frame and having a rotary shaft connected to the manually operated reverse drive control lever to rotate in response to pivotal movement of the manually operated reverse drive control lever.

14. A power-assisted material transport apparatus according to claim 12; wherein the potentiometer is a linear reciprocating potentiometer mounted on the steering mechanism and having a slide rod connected to the manually operated reverse drive control lever to reciprocate in response to pivotal movement of the manually operated reverse drive control lever.

15. A power-assisted material transport apparatus according to claim 12; wherein the steering mechanism comprises a pair of handlebars extending from a rear portion of the frame obliquely upward in a rearward direction of the apparatus.

16. A power-assisted material transport apparatus according to claim 15; wherein the wheel comprises a single wheel rotatably supported at a transverse central portion of the frame.

17. A power-assisted material transport apparatus, comprising: a frame; a load-carrying platform mounted on the frame; a wheel rotatably attached to the frame; a motor supported by the frame for rotating the wheel; a hand-controlled steering mechanism for steering the apparatus; a controller for controlling a direction and intensity of a rotating force of the motor; a slidable grip slidably mounted on the steering mechanism to slide in a forward direction in response to a forward thrust applied to the slidable grip; a linear displacement sensor for producing an output signal in accordance with the forward thrust applied to the slidable grip for controlling the magnitude of the rotating force of the motor in a forward direction; and a transmission for transmitting the rotational power from the motor to the wheel, the transmission including a forward-reverse changeover clutch disposed in the proximity of an axly of the wheel for mechanically switching rotating direction of the wheel between the forward direction and the reverse direction, the forward-reverse changeover clutch comprising a forward driven bevel gear and a reverse driven bevel gear rotatably mounted in a face-to-face relation on the axle, a drive bevel gear rotatably driven by the drive source and being in mesh with the forward and reverse driven bevel gears, forward clutch teeth formed on a surface of the forward driven bevel gear facing the reverse driven bevel gear, reverse clutch teeth formed on a surface of the reverse driven bevel gear facing the forward driven bevel gear, a clutch pin movably received in a longitudinal intermediate portion of the axle such that the clutch pin is movable along the axis of the axle with its opposite end portions projecting from the axle in a radial outward direction, a resilient member urging the clutch pin toward one end of the axle, the axle having an axial blind hole coaxial with the axle and extending from the one end toward the other end of the axle, a shift rod slidably fitted in the blind hole and having an inner end held in abutment with an outer peripheral surface of the clutch pin by the action of the resilient member, the shift rod being manually reciprocal to move the opposite end portions of the clutch pin selectively into meshing engagement with the forward clutch teeth or the reverse clutch teeth.

\* \* \* \* \*